United States Patent
Yu et al.

(10) Patent No.: US 8,239,847 B2
(45) Date of Patent: Aug. 7, 2012

(54) GENERAL DISTRIBUTED REDUCTION FOR DATA PARALLEL COMPUTING

(75) Inventors: Yuan Yu, Cupertino, CA (US); Pradeep Kumar Gunda, Mountain View, CA (US); Michael A Isard, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 530 days.

(21) Appl. No.: 12/406,842

(22) Filed: Mar. 18, 2009

(65) Prior Publication Data

US 2010/0241828 A1   Sep. 23, 2010

(51) Int. Cl.
*G06F 9/45* (2006.01)

(52) U.S. Cl. .......... 717/149; 717/146; 717/155; 712/22; 712/200; 712/203; 712/236; 712/244; 718/102; 718/106

(58) Field of Classification Search .......... None
See application file for complete search history.

(56) References Cited

U.S. PATENT DOCUMENTS

| | | | |
|---|---|---|---|
| 6,182,203 B1 * | 1/2001 | Simar et al. .......... | 712/22 |
| 6,311,265 B1 * | 10/2001 | Beckerle et al. .......... | 712/203 |
| 6,341,372 B1 * | 1/2002 | Datig .......... | 717/136 |
| 6,343,372 B1 * | 1/2002 | Felty et al. .......... | 717/136 |
| 7,650,331 B1 * | 1/2010 | Dean et al. .......... | 712/203 |
| 7,797,691 B2 | 9/2010 | Cockx et al. | |
| 7,840,949 B2 * | 11/2010 | Schumacher et al. .......... | 717/149 |
| 2007/0011155 A1 | 1/2007 | Sarkar | |
| 2007/0011437 A1 * | 1/2007 | Carnahan .......... | 712/200 |
| 2007/0038659 A1 | 2/2007 | Datar et al. | |
| 2008/0005547 A1 * | 1/2008 | Papakipos et al. .......... | 712/244 |
| 2008/0034357 A1 | 2/2008 | Gschwind | |
| 2008/0079724 A1 | 4/2008 | Isard et al. | |
| 2008/0082644 A1 | 4/2008 | Isard et al. | |
| 2008/0086442 A1 | 4/2008 | Dasdan et al. | |
| 2008/0098208 A1 * | 4/2008 | Reid et al. .......... | 712/234 |
| 2008/0098375 A1 | 4/2008 | Isard | |
| 2008/0120314 A1 | 5/2008 | Yang et al. | |
| 2008/0127200 A1 | 5/2008 | Richards et al. | |
| 2008/0250227 A1 | 10/2008 | Linderman et al. | |
| 2009/0089544 A1 * | 4/2009 | Liu .......... | 712/30 |
| 2010/0122065 A1 * | 5/2010 | Dean et al. .......... | 712/203 |
| 2010/0162230 A1 * | 6/2010 | Chen et al. .......... | 717/177 |

(Continued)

OTHER PUBLICATIONS

Blelloch, Guy E., et al., "Implementation of a Portable Nested Data-Parallel Language," School of Computer Science, Carnegie Mellon University, Pittsburgh, PA, Feb. 1993, Abstract, pp. 1-28.

(Continued)

*Primary Examiner* — Isaac Tecklu

(74) *Attorney, Agent, or Firm* — Vierra Magen Marcus & DeNiro LLP

(57) ABSTRACT

General-purpose distributed data-parallel computing using high-level computing languages is described. Data parallel portions of a sequential program written in a high-level language are automatically translated into a distributed execution plan. Map and reduction computations are automatically added to the plan. Patterns in the sequential program can be automatically identified to trigger map and reduction processing. Direct invocation of map and reduction processing is also provided. One or more portions of the reduce computation are pushed to the map stage and dynamic aggregation is inserted when possible. The system automatically identifies opportunities for partial reductions and aggregation, but also provides a set of extensions in a high-level computing language for the generation and optimization of the distributed execution plan. The extensions include annotations to declare functions suitable for these optimizations.

16 Claims, 13 Drawing Sheets

U.S. PATENT DOCUMENTS

2011/0004880 A1* 1/2011 Schumacher et al. ........ 718/102

OTHER PUBLICATIONS

Isard, Michael, et al., "Dryad: Distributed Data-Parallel Programs from Sequential Building Blocks," Microsoft Research, Sillicon Valley, [http://research.microsoft.com/research/dv/dryad/eurosys07.pdf], Mar. 23, 2007, 14 pages.

Ferreira, Renato, et al., "Data parallel language and compiler support for data intensive applications*1," Elsevier Science B.V., Parallel Computing, vol. 28, Issue 5, May 2002, 3 pages.

Carpenter, Bryan, et al., "HPJava: Data Parallel Extensions to Java," NPAC at Syracuse University, Syracuse, NY, Feb. 7, 1998, pp. 1-5.

Duffy, Joe, et al., "Parallel LINQ—Running Queries on Multi-Core Processors," Microsoft Corporation, [http://msdn.microsoft.com/en-us/magazine/cc163329.aspx], 2008, 8 pages.

Yu, Yuan, et al., "DryadLINQ: A System for General-Purpose Distributed Data-Parallel Computing Using a High-Level Language," 8th Usenix Symposium on Operating Systems Design and Implementation, Dec. 8, 2008, pp. 1-14.

Yu, Yuan, et al., "Some sample programs written in DryadLINQ," Microsoft Corporation, ftp://ftp.research.microsoft.com/pub/tr/TR-2008-74.pdf, May 11, 2008, pp. 1-37.

Isard, Michael, Dryad and DryadLINQ, Presentation to Hadoop Summit, Microsoft Corporation, Mar. 25, 2008, 15 pages.

Isard, Michael, et al., "Simple programming for simple distributed systems," Cambridge SRG, Jun. 9th, 2005.

Catanzaro, Bryan, et al., "A Map Reduce Framework for Programming Graphics Processors," University of California, Berkeley, CA, [http://web.mit.edu/rabbah/www/conferences/08/stmcs/papers/catanzaro-stmcs08.pdf], 2008, 6 pages.

Dean, Jeffrey, et al., "MapReduce: Simplified Data Processing on Large Clusters," Google, Inc., [http://labs.google.com/papers/mapreduce-osdi04.pdf], OSDI 2004, pp. 1-13.

Olston, Christopher, et al., "Automatic Optimization of Parallel Dataflow Programs," Yahoo! Research, [http://www.usenix.org/event/usenix08/tech/full_papers/olston/olston_html/index.html], Apr. 29, 2008, 11 pages.

U.S. Appl. No. 12/368,231, filed Feb. 9, 2009.

Ho, Ricky, "Apache PIG: Processing Language for Map/Reduce," Javalobby, May 28, 2008, 3 pages.

Honda, H., et al., "Parallel processing scheme for a FORTRAN program on a multiprocessor system OSCAR, " IEEE Pacific Rim Conference on Communications, Computers and Signal Processing, May 9-10, 1991, vol. 1, (Abstract downloaded from IEEE Xplore Digital Library), 1 page.

Peer to patent, Community Annotations to Prior Art—Apache PIG: Processing Language for Map/Reduce, Oct. 28, 2010, 2 pages.

Peer to patent, Community Annotations to Prior Art—U.S. Patent No. 7,650,331, Oct. 29, 2010, 21 pages.

Peer to patent, Community Annotations to Prior Art—U.S. Patent Publication No. 20100162230, Jan. 18, 2011, 21 pages.

Peer to patent, Community Annotations to Prior Art—U.S. Patent No. 7,797,691, Jan. 18, 2011, 36 pages.

Peer to patent, Community Annotations to Prior Art—Parallel processing scheme for a FORTRAN program on a multiprocessor system OSCAR—Prior Art Detail, Oct. 25, 2010, 2 pages.

* cited by examiner

Figure 4
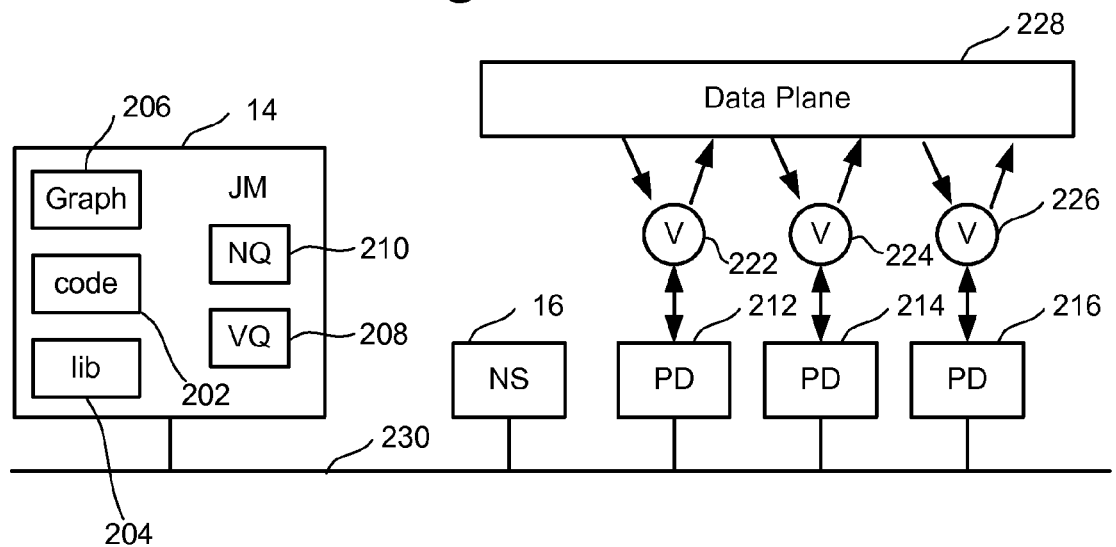
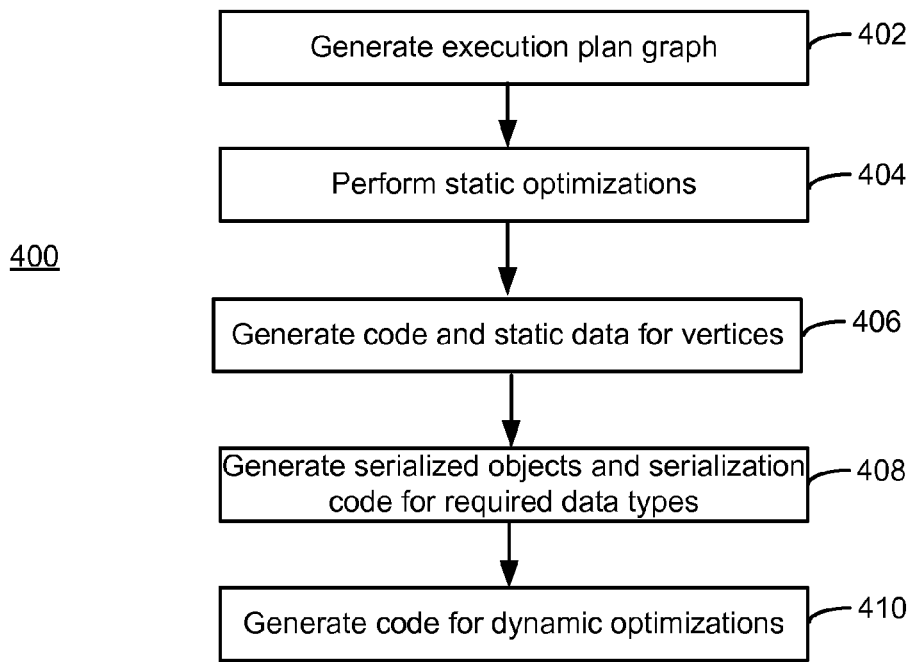
Figure 8

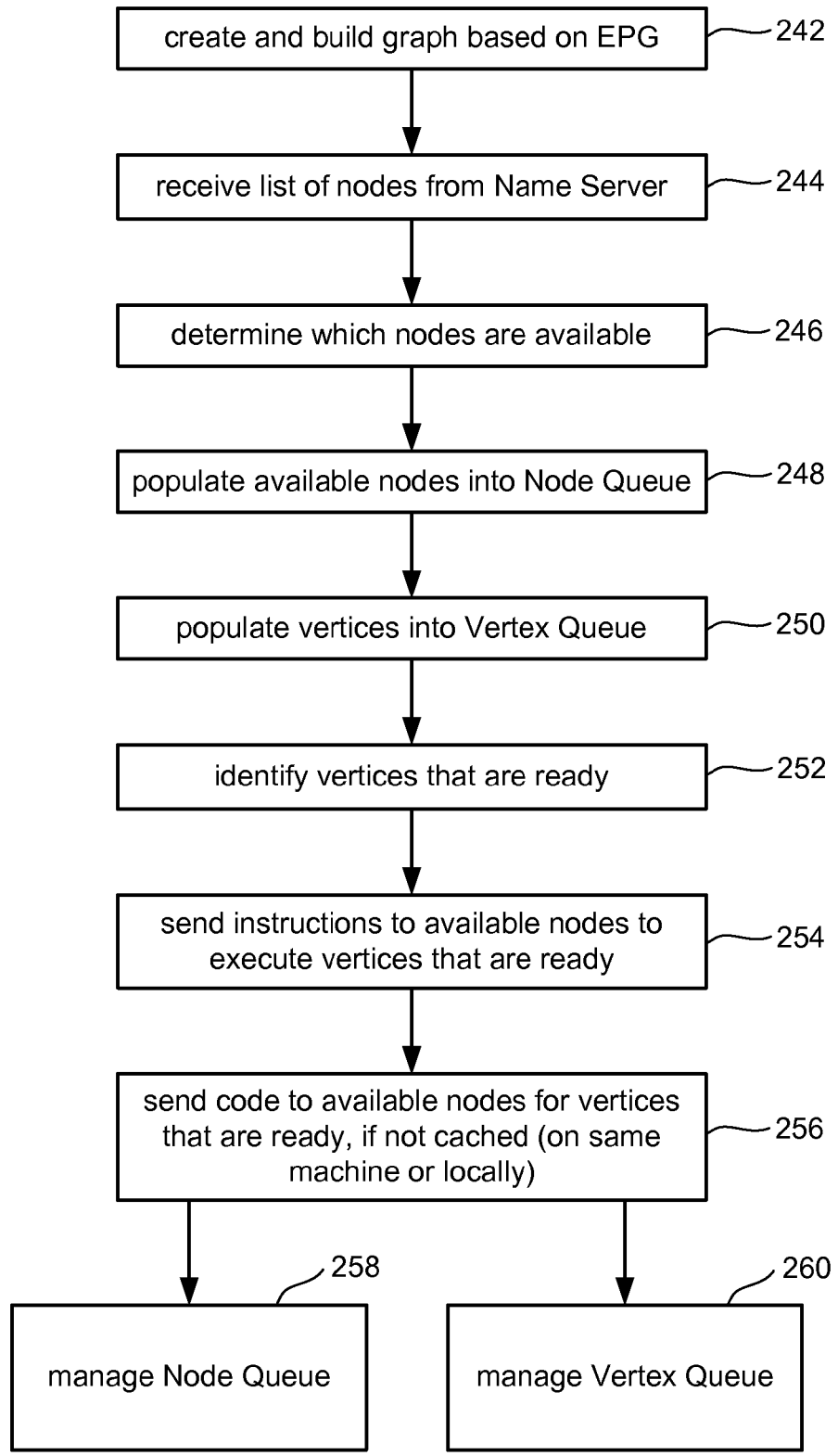

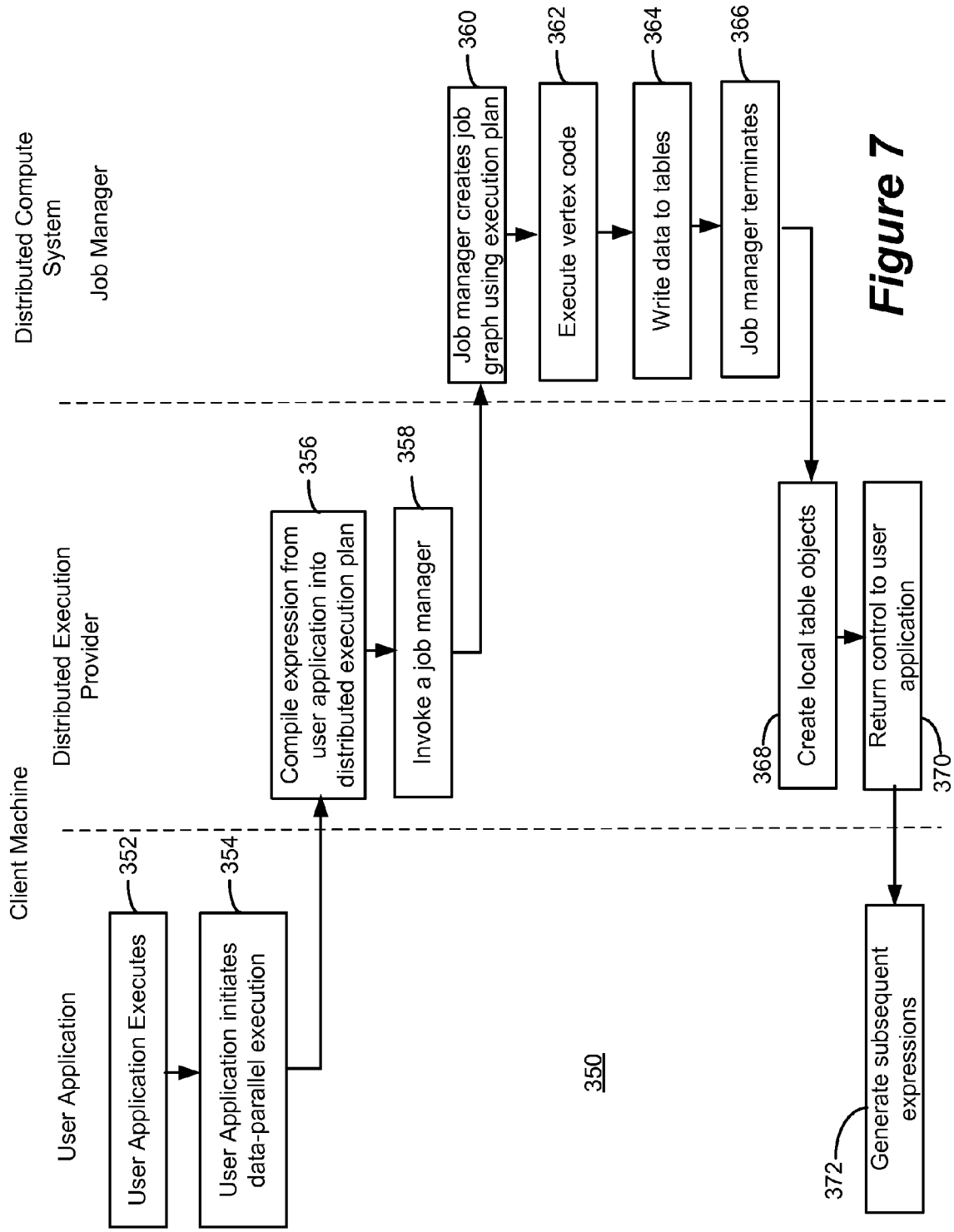

```
[Reducible(F=..., G=...)]
Seq(R) R(K k, Seq(M)) { ... }
```

*Figure 12A*

```
public static Triple StdIR(IEnumerable<double> g)
{
        return new Triple(g.Count(),
                          g.Sum(),
                          g.Select(x => x*x).Sum());
}
```
⎱ 520

```
public static double StdFR(IEnumerable<Triple> g)
{
        var count = g.Select(x => first).Sum();
        var e1 = g.Select(x => x.second).Sum()/count;
        var e2 = g.Select(x => x.third).Sum()/count;
        return Math.Sqrt(e2 - (e1*e1));
}
```
⎱ 522

```
[Decomposable("StdIR", "StdFR")]
public static double StdDev(IGrouping<int,double> g)
{
        return StdFR(new Triple[] { StdIR(g) });
}
```
⎱ 524

*Figure 12B*

```
Pair Combiner(IGrouping<K,M> g)
{
        return new Pair(g.Key, new Tuple(C_1(g), ..., C_n(g)));
}
```
⎬ 620

```
Tuple DynamicCombiner(IGrouping<K, Tuple> g)
{
        h_1 = F_1(g.Select(x => x[1]));
        ...;
        h_n = F_n(g.Select(x => x[n]));
        return new Tuple(h_1, ..., h_n);
}
```
⎬ 622

```
R FinalReducer(IGrouping<K, Tuple> g)
{
        <h_1, ..., h_n> = DynamicCombiner(g);
        return reduce(h_1, ... h_n);
}
```
⎬ 624

US 8,239,847 B2

GENERAL DISTRIBUTED REDUCTION FOR DATA PARALLEL COMPUTING

BACKGROUND

One of the most challenging problems in the field of computing today is how to allow a wide variety of software developers to compute effectively on large amounts of data.

Parallel processing is one technique that has been employed for increasing the efficiency of computing on large amounts of data. Traditionally, parallel processing refers to the concept of speeding-up the execution of a program by dividing the program into multiple fragments that can execute concurrently, each on its own processor. A program being executed across n processors might execute n times faster than it would using a single processor. The terms concurrently and parallel are used to refer to the situation where the period for executing two or more processes overlap in time, even if they start and stop at different times. It is possible to perform parallel processing by connecting multiple computers in a network and distributing portions of the program to different computers on the network.

Many software application developers are not experienced with parallel processing. Therefore, it can be difficult for them to write an application that can take advantage of parallel processing. Moreover, it is often difficult to divide an application program in such a way that separate processors can execute different portions of a program without interfering with each other. There has been a great deal of research performed with respect to automatically discovering and exploiting parallelism in programs which were written to be sequential. The results of that prior research, however, have not been successful enough for most developers to efficiently take advantage of parallel processing in a cost effective manner.

SUMMARY

The described technology pertains to general-purpose distributed data-parallel computing using high-level computing languages. Data parallel portions of a sequential program written by a developer in a high-level language are automatically translated into a distributed execution plan. Code for execution of the plan in a compute cluster of a distributed execution engine is automatically generated. Map and reduction processing of expressions invoked by the sequential program is supported. These computations are added to the plan in response to direct invocations by the user. Additionally, the identification of patterns in the program can be used to automatically trigger map and reduction processing. When the reduce stage is reducible or combiner-enabled, one or more portions of its computation are pushed to the map stage. Dynamic aggregation is also inserted when possible. While the system automatically identifies opportunities for partial reduction and aggregation, a set of extensions in a high-level computing language for the generation and optimization of the distributed execution plan are also provided. The extensions include annotations to declare functions suitable for these optimizations.

A method of distributed parallel processing according to one embodiment includes receiving an expression from a sequential program that is executing at a first machine, automatically generating an execution plan including a map phase and a reduction phase for executing the expression in parallel at nodes of a compute cluster, and providing the execution plan to an execution engine that controls parallel execution of the expression in the compute cluster.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

FIG. 4 is a logical view of the system depicted in FIG. 1.

FIG. 5 depicts a flowchart describing one embodiment of a process performed by a job manager when executing code on the distributed execution engine of FIG. 1.

FIG. 7 depicts one embodiment of a process for executing data-parallel portions of the application program in a distributed compute system.

FIG. 8 is one embodiment of a process for compiling expressions from a user application into a distributed execution plan.

FIG. 12A is pseudocode describing a user-supplied reducible annotation that can be used by the distributed compute system to optimize map and reduction processing.

FIG. 12B is pseudocode describing a user-supplied decomposable annotation that can be used by the distributed compute system to optimize map and reduction processing.

DETAILED DESCRIPTION

Figure 1:
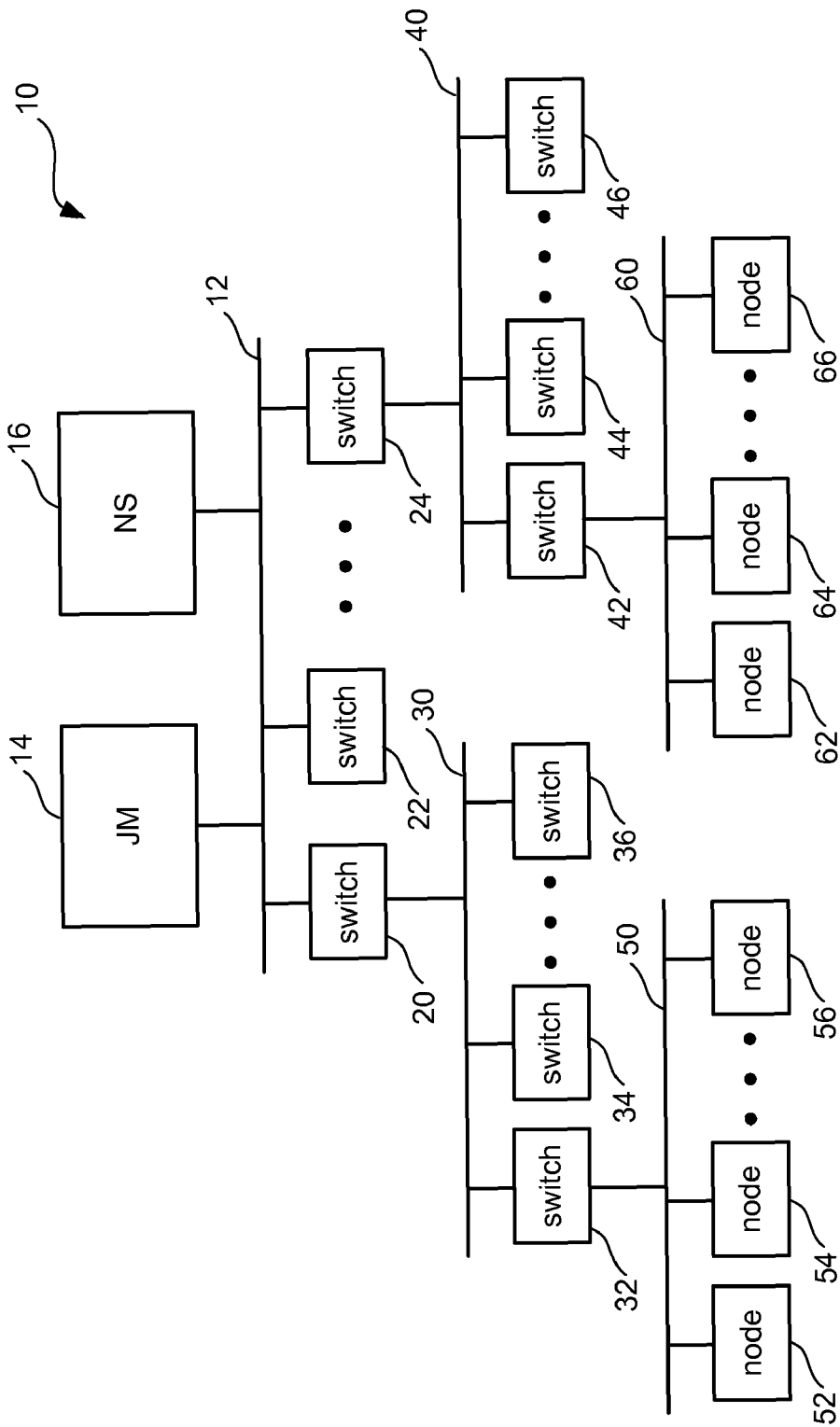
FIG. 1 is a block diagram of one embodiment of a distributed execution engine.

The disclosed technology pertains to general-purpose distributed data-parallel processing using high-level languages. Data-parallel portions of an application program are automatically translated into a distributed execution plan for processing by a distributed execution engine that exploits the parallelism for more efficient transactions. The distributed execution engine includes a distributed compute cluster having nodes that execute expressions in parallel. A developer can create a sequential program in a high level language ("application program"). The application program may be considered a hybrid program with code executing on a client machine and data-parallel portions suitable for execution in parallel at the distributed compute cluster. A distributed execution provider automatically translates the data-parallel portions into the distributed execution plan for execution on the nodes in the cluster.

Map reduction programming models are supported by the distributed execution system. Map reduction programming models express computations using user-supplied map and reduce functions. The distributed execution plan is generated with map and reduction computations when possible to optimize execution in the compute cluster. Developers may specifically invoke map reduction processing. Additionally, the execution provider can automatically identify expressions suitable for map reduction processing, for example, by identifying particular patterns in the application program. The reduction stage is often reducible as a result of homomorphic and/or decomposable properties for example. In such instances, one or more portions of the reduce computation are pushed to the map stage to perform a partial reduction on the data, thereby decreasing network traffic. Dynamic aggregation is also inserted when possible. The system can automatically identify opportunities for partial reduction and aggregation. A set of extensions in a high-level computing language for the generation and optimization of the execution plan are also provided. The extensions include annotations to declare functions suitable for these optimizations.

In some embodiments, the distributed execution plan includes an execution plan graph ("EPG") and code for the vertices of the EPG ("vertex code"). The compiler may also serialize data objects that are referenced in the application program and needed for execution of the vertex code in the compute cluster. The serialized data objects may be considered to be part of the distributed execution plan. In some embodiments, the compiler generates additional code, such as code that is used to facilitate optimizing execution in the compute cluster.

In some embodiments, the overall system can be considered to be broken into three distinct pieces: 1) an application layer, 2) an execution engine, and 3) storage. The application layer includes both the application that the developer wrote and the compiler that automatically generates the distributed execution plan. The execution engine receives the execution plan and manages parallel execution in the compute cluster. The storage layer may include a database manager system (DBMS) for receiving queries. This separation may allow the application layer to interoperate with a variety of different types of execution engines, as well as a variety of different types of storage layers.

In some embodiments, the distributed execution provider provides the automatically generated distributed execution plan (e.g., EPG, vertex code, serialized data objects and serialization code) to an execution engine for execution in the compute cluster. Thus, the execution engine may be a separate program from the distributed execution provider that generated the distributed execution plan. FIG. 1 is a block diagram of an architecture for a suitable execution engine that is implemented as a tree-structure network 10 having various sub-networks within the tree-structure connected via switches. The execution engine can be used to cause the data-parallel portions of the application program to execute in the compute cluster. However, note that the data-parallel portions of the application program can be executed by a different execution engine than the example described herein. In other words, the code that is automatically generated (e.g., vertex code) can be executed by a different execution engine.

Sub-network 12 includes Job Manager 14 and Name Server 16. Sub-network 12 also includes a set of switches 20, 22, . . . , 24. Each switch connects sub-network 12 with a different sub-network. For example, switch 20 is connected to sub-network 30 and switch 24 is connected to sub-network 40. Sub-network 30 includes a set of switches 32, 34, . . . , 36. Sub-network 40 includes a set of switches 42, 44, . . . , 46. Switch 32 is connected to sub-network 50. Switch 42 is connected to sub-network 60. Sub-network 50 includes a set of computing machines 52, 54, . . . , 56. Sub-network 60 includes a set of computing machines 62, 64, . . . , 66. Computing machines 52, 54, . . . , 56 and 62, 64, . . . , 66 (as well as other computing machines at the bottom levels of the hierarchy of the tree-structured network) make up the cluster of machines that form the distributed execution engine. Although FIG. 1 shows three levels of hierarchy, more or fewer than three levels can be used. In another embodiment the network may not be tree-structured, for example it could be arranged as a hypercube.

The automatically generated vertex code is executed as a parallel processing job (hereinafter referred to as a "job") that is coordinated by Job Manager 14, which is a process running on a dedicated computing machine or on one of the computing machines in the compute cluster. Job Manager 14 is responsible for instantiating a job's dataflow graph, scheduling processes on nodes in the compute cluster to cause the vertex code to execute, providing fault-tolerance by re-executing failed or slow processes, monitoring the job and collecting statistics, and transforming the job dataflow graph (or simply "job graph") dynamically based on callbacks in order to optimize execution. Name Server 16 is used to report the names (or other identification information such as IP Addresses) and position in the network of all of the computing machines in the cluster. There is a simple daemon (or service) running on each computing machine in the cluster which is responsible for creating processes on behalf of Job Manager 14.

Figure 2:
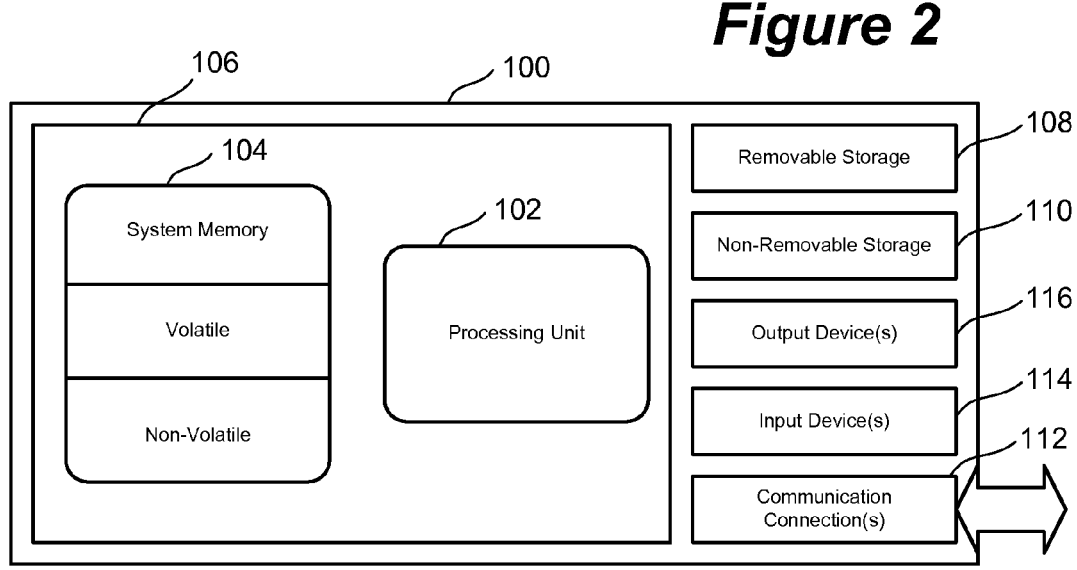
FIG. 2 is a block diagram of a computing machine that can be used to implement one embodiment of the nodes depicted in FIG. 1.

FIG. 2 depicts an exemplary computing device 100 for implementing the various computing machines of the cluster (e.g., machines 52, 54, . . . , 56 and 62, 64, . . . , 66), Job Manager 14 and/or Name Server 16. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. Processing unit 102 may be a single core, dual core or other form of multiple core processing unit. This most basic configuration is illustrated in FIG. 2 by line 106.

Additionally, device 100 may also have additional features/functionality. For example, device 100 may also include additional storage (removable and/or non-removable) including, but not limited to, magnetic disk, optical disks or tape. Such additional storage is illustrated in FIG. 2 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer (or processor) readable storage media. Such media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Device 100 may also contain communications connection(s) 112 that allow the device to communicate with other devices via a wired or wireless network. Examples of communications connections include network cards for LAN connections, wireless networking cards, modems, etc.

Device 100 may also have input device(s) 114 such as keyboard, mouse, pen, voice input device, touch input device, etc. Output device(s) 116 such as a display/monitor, speakers, printer, etc. may also be included. All these devices (input, output, communication and storage) are in communication with the processor.

The technology described herein can be implemented using hardware, software, or a combination of both hardware and software. The software used is stored on one or more of the processor readable storage devices described above to program one or more of the processors to perform the functions described herein. In alternative embodiments, some or all of the software can be replaced by dedicated hardware including custom integrated circuits, gate arrays, FPGAs, PLDs, and special purpose computers.

Figure 3:
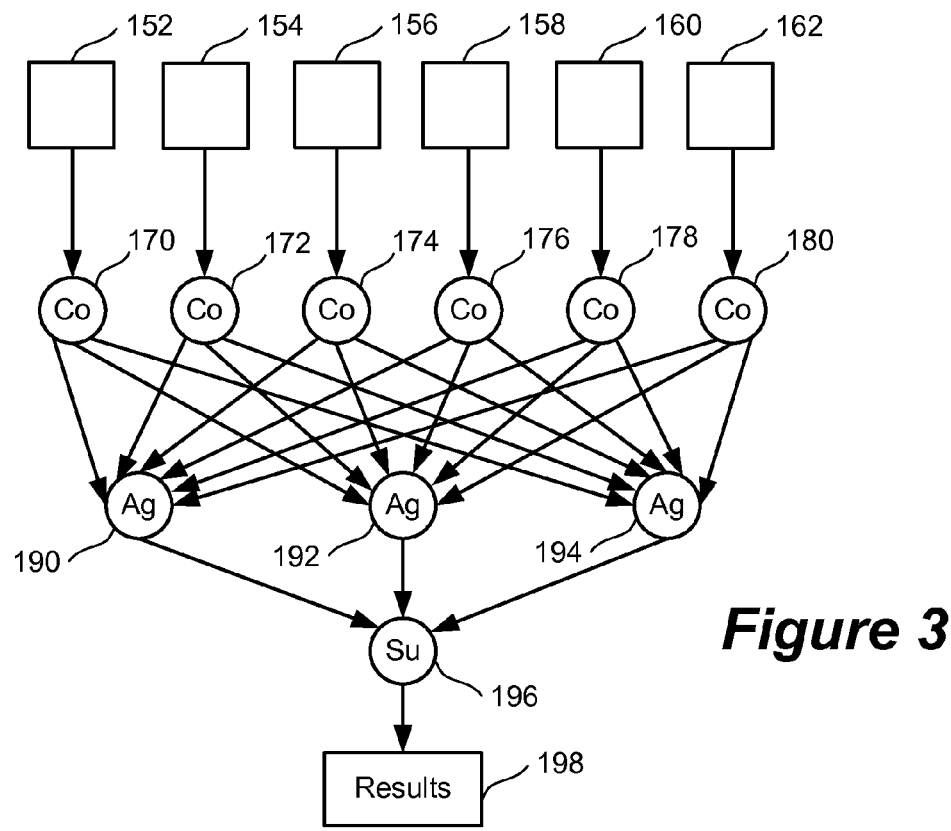
FIG. 3 is an example of a directed graph.

In some embodiments, a distribution execution provider analyzes portions of the user application and automatically generates a file that describes a directed graph (also referred to herein as an EPG) and code for vertices of the directed graph. As an example, the file that describes the directed graph could be an XML file. Job Manager 14 will build a job graph based on the file that describes the directed graph and manage the distribution of the vertex code to the various compute nodes of the distributed compute cluster. FIG. 3 provides one example of a block diagram of a directed graph that represents a system that reads query logs gathered by an Internet search service, extracts the query strings, and builds a histogram of query frequencies sorted by frequency. In the example of FIG. 3, the directed graph is acyclic; however, the directed graph could be cyclic.

In some embodiments, a job's external input and output files are represented as vertices in the graph even though they do not execute any program. Typically, for a large job, a single logical "input" is split into multiple partitions which are distributed across nodes in the system as separate files. Each of these partitions can be represented as a distinct input vertex. In some embodiments, there is a graph constructor which takes the name of a distributed file and returns a graph made from a sequence of its partitions. The application will interrogate its input graph to read the number of partitions at runtime in order to generate the appropriate replicated graph. For example, FIG. 3 shows six partitions or files 152, 154, 156, 158, 160 and 162 of the log created by the Internet search service.

The first level of the hierarchy of the graph of FIG. 3 includes vertex code (Co) for implementing vertices 170, 172, 174, 176, 178 and 180. Herein, the code for a particular vertex may also be referred to as a "vertex program" or simply a "vertex." As already stated, a distributed execution provider of some embodiments automatically generates this vertex code from expressions in the application program running on the client machine. The vertex code (Co) reads its part of the log files, parses the data to extract the query strings, sorts the query string based on a hash of the query string, and accumulates the total counts for each query string. Although eight vertices are shown (170, 172 . . . 180), more or fewer than eight vertices can be used. In one embodiment, there will be one vertex at this level for each partition of the log. Each of the vertices will output a set of hashes representing the query strings and a total count for each hash. This information will then be sent to an appropriate aggregator (Ag) vertex, depending on the hash.

FIG. 3 shows three vertices 190, 192 and 194 implementing the aggregator (Ag). The potential set of queries will be broken up into three buckets, with one subset of hashes being sent to aggregator 190, a second subset of hashes being sent to aggregator 192, and a third subset of hashes being sent to aggregator 194. In some implementations, there will be more or fewer than three aggregators. Each of the vertices 170-180 will be in communication with all of the aggregators to send data to the appropriate aggregator based on the hash. The aggregators 190, 192 and 194 will aggregate all of the counts for each query based on data received from vertices 170-180. Each of the aggregators 190, 192 and 194 will report its data to (Su) vertex 196, which will combine the sums for all of these various queries and store those sums in results file 198. As can be seen, vertices 170-180 access data in parallel and can be executed in parallel. Similarly, aggregators 190-194 can also be executed in parallel. Thus, Job Manager 14 will distribute the vertex code to maximize efficiency for the system.

In one embodiment, a job utilizing the technology described herein has two levels of abstraction. At a first level of abstraction, the overall structure of the job is determined by the communication flow. This communication flow is the directed graph where each vertex is a process and edges represent data channels. In some embodiments, the directed graph is automatically generated based on analysis of the application program running on the client. The directed graph is automatically mapped onto physical resources by the execution engine. The second level of abstraction is the vertex code which implements the vertices.

In some embodiments, every vertex program deals with its input and output through the channel abstraction. As far as the body of vertex programs is concerned, channels transport objects. This ensures that the same vertex program is able to consume its input either from disk or when connected to a shared memory channel—the last case avoids serialization/deserialization overhead by passing the pointers to the objects directly between producer and consumer. Note that other channels implementations including, but not limited to, TCP pipes and HTTP connections are possible.

In some implementations, the base class for vertex programs supplies methods for reading any initialization parameters which were set during graph construction and transmitted as part of the vertex invocation. These include a list of string arguments and an opaque buffer into which the program may serialize arbitrary data. When a vertex program is first started but before any channels are opened, the runtime calls a virtual initialization method on the base class. This method receives arguments describing the number of input and output channels connected to it.

In one implementation, the input and output channels are opened before the vertex program starts. In another implementation channels are opened as needed, which requires fewer resources on the channel endpoint from which data originates and which may speed-up execution. In some cases, channels are opened in a random order to minimize resource contention. Any error at this stage causes the vertex program to report the failure and exit. This will trigger Job Manager 14 to try to recreate the missing input. In other embodiments, other schemes can be used. When all of the channels are opened, a vertex Main routine is called and passed channel readers and writers for all its inputs and outputs respectively. The readers and writers may have a blocking interface to read or write the next item which suffices for most simple applications. There may be a method on the base class for inputting status which can be read by the monitoring system, and the progress of channels may be automatically monitored. An error reporting interface allows that vertex program to communicate a formatted string along with any additional application-defined metadata. The vertex program may exit before reading all of its inputs. A process which contains a long pipeline of vertex programs connected via shared memory channels and ending, for example, with a "Head" vertex will propagate the early termination of Head all the way back to the start of the pipeline and exit without reading any unused portion of its inputs. In other embodiments, other schemes can be used.

FIG. 4 provides a logical view of the system depicted in FIG. 1 and how that system makes use of the vertex code 202. FIG. 4 shows Job Manager 14 connected to network system 230, which can be the network 10 of FIG. 1. Also connected to network system 230 are Name Service 16 and a set of computing machines 212, 214 and 216. Although FIG. 4 only shows three computing machines, it is possible to have fewer than three computing machines or more than three computing machines. In some embodiments there could be thousands of computing machines. Each computing machine has a process daemon (PD) running. Job Manager 14 will cause the various process daemons to run various vertices (e.g., vertices 222, 224, 226), which are in communication with the data plane 228. Data plane 228 is an arbitrary data transport mechanism used to implement channels (e.g., files, TCP pipes, or shared memory channels). Job Manager 14 includes vertex code 202, library 204, job graph 206, Vertex Queue 208, and Node Queue 210.

Library 204 provides a set of code to enable Job Manager 14 to create a job graph 206, build the job graph, and execute the job graph across the distributed execution engine. In one embodiment, library 204 can be embedded in C++ using a mixture of method calls and operator overloading. In one embodiment, library 204 defines a C++ base class from which all vertex programs inherit. Each such program has a textural name (which is unique within an application) and a static "factory" which knows how to construct it. A graph vertex may be created by calling the appropriate static program factory. Any required vertex-specific parameter can be set at this point by calling methods on the program object. The parameters are then marshaled along with the unique vertex name (referred to herein as a unique identification—UID) to form a simple closure which can be sent to a remote process or execution. Every vertex program is placed in a stage. In some implementations, a stage is created by replicating one vertex. In a large job, all the vertices in a level of hierarchy of the graph might live in the same stage; however, this is not required. In other embodiments, other schemes can be used.

The first time a vertex program is executed on a computer, its binary is sent from the Job Manager 14 to the appropriate process daemon (PD). The vertex program can be subsequently executed from a cache. In some embodiments, all vertices in a job share the same binary, which allows for efficient caching because vertex binaries sent for one stage can be reused by other stages. Job Manager 14 can communicate with the remote vertices, monitor the state of the computation, monitor how much data has been read, and monitor how much data has been written on its channels. Legacy executables can be supported as vertex programs by connecting the legacy executable with named pipes to a stub which redirects the data from the pipes to channels.

Job Manager 14 keeps track of the state and history of each vertex program in the job graph 206. A vertex program may be executed multiple times over the length of the job due to failures, and certain policies for fault tolerance. In one implementation, each execution of the vertex program has a version number and a corresponding execution record which contains the state of the execution and the versions of the predecessor vertices from which its inputs are derived. In one aspect, each execution names its file-based output channel uniquely using its version number to avoid conflicts when multiple versions execute simultaneously. In one implementation, each vertex executes in a separate isolated "sand-box." Therefore, multiple versions of the same vertex do not clash because each one uses a separate sand-box. One implementation of sand-boxes is to use separate root directories. However, more complex implementations, based on virtual machines are possible. The sand-boxes may be managed by the process daemons. If the entire job completes successfully, then each vertex program selects one of its successful executions and renames the output files to their correct final forms.

When all of a vertex program's input channels become ready, a new execution record is created for the vertex program in the "Ready" state and gets placed in Vertex Queue 208. A disk based channel is considered to be ready when the entire file is present. A channel which is a TCP pipe or shared memory FIFO is ready when the predecessor vertex has at least one execution record in the "Running" state.

Each of the vertex's channels may specify a "hard constraint" or a "preference" listing the set of computing machines on which it would like to run. The constraints are attached to the execution record when it is added to Vertex Queue 208 and they allow the application writer to require that a vertex be collocated with a large input file, and in general that the Job Manager 14 preferentially run computations close to their data.

When a Ready execution record is paired with an available computer it transitions to the Running state (which may trigger vertices connected to its parent via pipes or FIFOs to create new Ready records). While an execution is in the Running state, Job Manager 14 receives periodic status updates from the vertex. On successful completion, the execution record enters the "Completed" state. If the vertex execution fails, the record enters the "Failed" state, which may cause failure to propagate to other vertices executing in the system. A vertex that has failed will be restarted according to a fault tolerance policy. If every vertex simultaneously has at least one Completed execution record, then the job is deemed to have completed successfully. If any vertex is reincarnated more than a set number of times, the entire job has failed.

Files representing temporary channels are stored in directories managed by the process daemon and are cleaned up after job completion. Similarly, vertices are killed by the process daemon if their parent job manager crashes.

FIG. 5 depicts a flowchart describing one embodiment of a process performed by Job Manager 14 when executing vertex code 202 on the distributed execution engine of FIG. 1. In step 242, Job Manager 14 creates the job graph 206 based on the EPG and vertex code 208. In one embodiment, the EPG is a description of an execution plan, such as a description written in XML. Thus, Job Manager 14 may create the job graph 206 from an XML description.

In step 244, Job Manager 14 receives a list of nodes from Name Server 16. Name Server 16 provides Job Manager 14 with the name (or identification) of each node within the network as well as the position of each node within the tree-structured network. In many embodiments, a node is a computing machine. In some embodiments, a computing machine may have more than one node.

In step 246, Job Manager 14 determines which of the nodes are available. A node is available if it is ready to accept another program (associated with a vertex) to execute. In one implementation, Job Manager 14 queries each process daemon to see whether it is available to execute a program. In one implementation, Job Manager 14 assumes that all machines listed by the NS are available. If Job Manager 14 cannot connect to a PD (or if a PD fails to often), then Job Manager 14 marks the PD as unusable. Job Manager 14 may dispatch several copies of each vertex to a set of process daemons chosen according to a scheduling algorithm. In step 248, Job Manager 14 populates all of the available nodes into Node Queue 210. In step 250, Job Manager 14 places all the vertices that need to be executed into Vertex Queue 208. In step 252, Job Manager 14 determines which of the vertices in Vertex Queue 208 are ready to execute. In one embodiment, a vertex is ready to execute if all of its inputs are available.

In step 254, Job Manager 14 sends instructions to the process daemons of the available nodes to execute the vertices that are ready to be executed. Job Manager 14 pairs the vertices that are ready with nodes that are available, and sends instructions to the appropriate nodes to execute the appropriate vertex. In step 256, Job Manager 14 sends the code for the vertex to the node that will be running the vertex code, if that code is not already cached on the same machine or on another machine that is local (e.g., in same sub-network). In most cases, the first time a vertex is executed on a node, its binary will be sent to that node. After executing the binary, that binary will be cached. Thus, future executions of that same code need not be transmitted again. Additionally, if another machine on the same sub-network has the code cached, then the node tasked to run the code could get the program code for the vertex directly from the other machine on the same sub-network rather than from Job Manager 14. After the instructions and code are provided to the available nodes to execute the first set of vertexes, Job Manager 14 manages Node Queue 210 in step 258 and concurrently manages Vertex Queue 208 in step 260.

Managing node queue 258 includes communicating with the various process daemons to determine when there are process daemons available for execution. Node Queue 210 includes a list (identification and location) of process daemons that are available for execution. Based on location and availability, Job Manager 14 will select one or more nodes to execute the next set of vertices. Steps 252-256 may be repeated until all vertices have been run.

Further details of execution engines can be found in U.S. Published Patent Application 2008/0082644, entitled "Distributed Parallel Computing;" U.S. Published Patent Application 2008/0098375, entitled "Runtime Optimization of Distributed Execution Graph;" and U.S. Published Patent Application 2008/0079724, entitled "Description Language for Structured Graphs;" all of which are all hereby incorporated by reference for all purposes.

Figure 6:
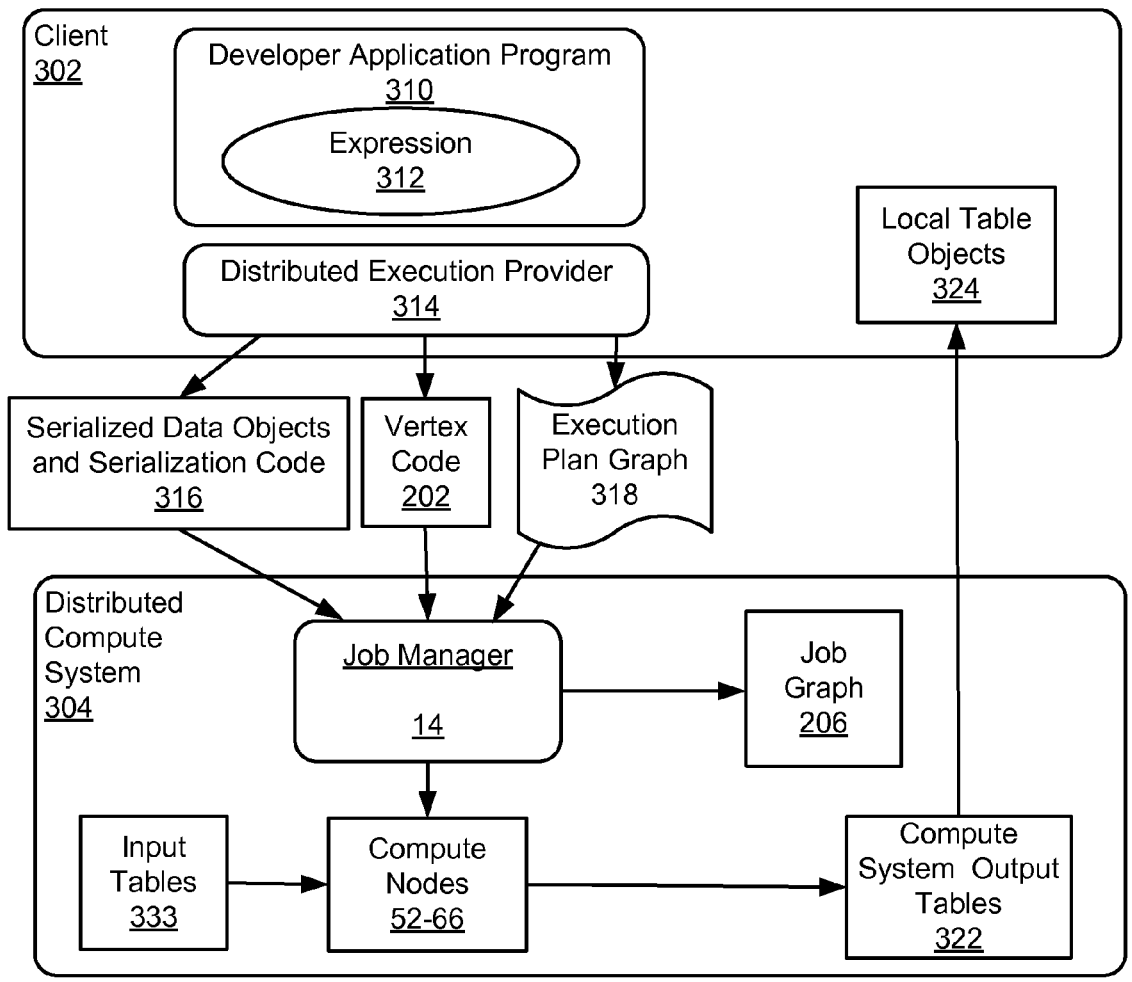
FIG. 6 depicts one embodiment of software and data structures used for data-parallel processing.

FIG. 6 depicts one embodiment of software and data structures used for data-parallel processing. In general, FIG. 6 depicts a client machine 302 and a distributed compute system 304. The client machine 302 may be implemented with computer device 100 depicted in FIG. 2. The client 302 is running an application program 310 and a distributed execution provider 314 that extracts expressions 312 (or expression trees) from the application program 310. Based on the expressions 312, the distributed execution provider 314 generates an execution plan graph ("EPG") 318, vertex code 202, and serialized data objects and serialization code 316, which are each provided to the distributed compute system 304. In this example, Job Manager 14 distributes the vertex code 202 and serialized objects and serialization code 316 to compute nodes 52-66. In one embodiment, the client machine 302 can form part of the distributed compute system 304.

Note that the application program 310 may be a sequential program that has code that executes on the client 302 in addition to the data-parallel portions that execute in the distributed compute system 304. For example, the data-parallel code might perform a page-rank of web pages, whereas the code that executes on the client 302 might present the page rank statistics to a user in a graphical user interface. Thus, the application program 310 may be thought of as a "hybrid" program. Note that in some conventional systems two separate programs would need to be written to accomplish what application program 310 performs. For example, a first program might be written in a language such as SQL to perform database queries and second program might be written in a language such as C to perform functions at the client device. Moreover, in some embodiments, the developer does not need to be concerned over which variables are local to the client 302 and which are remote because the distributed execution provider 314 takes care of this.

The application program 310 may have both declarative and imperative operations. The application program 310 may include traditional structuring constructs such as functions, modules, and libraries, and express iteration using standard loops. In some embodiments, the distributed execution plan employs a fully functional, declarative description of the data-parallel components, which enables sophisticated rewritings and optimizations such as those traditionally employed by parallel databases.

In one implementation, the application program 310 is written in the LINQ (Language INtegrated Queries) programming language. A LINQ program is a sequential program composed of LINQ expressions. A LINQ program is a .NET Framework component that adds native data querying capabilities to .NET languages. The .NET framework is a software framework that is available with several operating systems that are available from Microsoft corporation of Redmond, Wash. A LINQ program can be debugged using standard .NET development tools. The application program 310 is not limited to LINQ nor is it limited to the .NET Framework.

FIG. 7 depicts one embodiment of a process 350 for executing data-parallel portions of the application program 310 in a distributed compute system 304. FIG. 6 will be referred to when discussed the process 350. In step 352, a user application 310 executes on the client machine 302. In one embodiment, the user application 310 is written by the developer in a high level language. In one embodiment, the application program 310 creates one or more expressions 312 during runtime. However, the actual execution of the expression 312 may be deferred until later in the process 350.

In one implementation, the expression 312 is based on classes provided by a .NET library. In one aspect, the expression 312 is base on .NET "Expression" classes. A .NET Expression class is in the namespace System.Linq.Expression. There are numerous subclasses, such as BinaryExpression, ConstantExpression, UnaryExpression, LambdaExpression, MemberAssignment, etc. For example, an expression 312 may be implemented as a tree of expression classes with each node in the tree being an operator. Child nodes may show inputs to operators. As a specific example, the addition of two constants may be represented as a tree with a root of "BinaryExpression" and two leaf nodes containing the constant expressions. Thus, as previously discussed an expression 312 might also be referred to as an expression tree.

In step 354, the user application 310 initiates data parallel execution, which may result the expression 312 being passed to the distributed execution provider 314. In one aspect, the user application 310 makes a call in order to initiate data parallel execution. However, it is not required that the user application 310 make call to initiate data parallel execution. In one aspect, data parallel execution is initiated in response to the user application 310 attempting to enumerate a value for an expression 312. When the user application 310 attempts to enumerate a value for the expression 312, data parallel execution is initiated to compute the value.

In step 356, the distributed execution provider 314 compiles the expression 312 into a distributed execution plan 318. Step 356 may include the decomposition of the expression 312 into sub-expressions. Each sub-expression corresponds to a vertex. Step 356 may also include the automatic generation of the vertex code, as well as static data for the vertices. Further, serialization code may be automatically generated for the data types needed to execute at the remote computer nodes.

As previously discussed, in some implementations, the expressions 312 are based on the Expression class of a .NET library. In one aspect, the distributed execution provider 314 manipulates and transforms the expression 312 and breaks it into pieces. In one aspect, each piece is used to generate C# code, which is the vertex code 202. Note that data structures represented by the expressions 312 may be similar to syntax trees that are used by compilers to represent the code during the compilation process.

In step 358, the distributed execution provider 314 invokes a Job Manager 14. In one embodiment, the Job Manager 14 executes behind a firewall. In step 360, Job Manager 14 creates a job graph 206 using the distributed execution plan 318 that was generated in step 354. Job Manager 14 schedules and spawns the vertices as resources become available in the distributed compute system 304. In step 362, each of the vertices executes the code 202 that was generated in step 354. The compute nodes have access to input tables 333 to make computations. The input tables 333 are data being processed by the user application 310. Some of the input tables 333 can be based on the result of a previous computation performed by the distributed compute system 304 for the user application 310. The datasets in the input tables 333 can also be based on some other external computation. Note that the input tables 333 may be composed of partitions that reside on different machines and that each partition can have replicas on different machines. In step 364, the job completes and the results are output to the distributed compute system output tables 322.

In step 366, Job Manager 14 terminates, returning control back to the distributed execution provider 314. In step 368, the distributed execution provider 314 creates local table objects 324 encapsulating the output of execution in the distributed compute system 304. These local objects 324 may then be used as inputs to subsequent expressions 312 in the user application program 310. In one implementation, local table objects 324 are fetched to the local context only if explicitly de-referenced.

In step 370, control returns to the user application program 310. The user application 310 has access to the local table objects 324. In one implementation, an iterator interface allows the user application 310 to read the local table objects 324 as .NET objects. However, there is no requirement of using .NET objects.

In step 372, the application program 310 may generate subsequent expressions 312, which may be executed by repeating steps 352-370.

FIG. 8 is one embodiment of a process 400 for compiling an expression 312 from a user application 310 into a distributed execution plan. Process 400 is one implementation of step 356 of process 350. In step 402, an execution plan graph (EPG) is generated from an expression 312. Step 402 occurs when the distributed execution provider 314 receives control after the application program 310 initiates parallel processing. The distributed execution provider 314 converts the raw expression 312 into an execution plan graph (EPG) 318, where each vertex is an operator and edges represent its inputs and outputs. The EPG 318 may be related to a conventional database query plan; however, the EPG may encompass computations that are not easily formulated as "queries." The EPG may be a directed graph, which may or may not be acyclic. The existence of common sub-expressions and operators like "Fork" means that EPGs cannot always be described by trees. In some implementations, the EPG is a "skeleton" that is written in a language such as XML. For example, the EPG may be a skeleton of the job data-flow graph 206 that will be executed by the execution engine.

In step 404, static optimizations of the EPG 318 are performed. In one implementation, the distributed execution provider 314 applies term-rewriting optimizations on the EPG 318. In one embodiment, each EPG node is replicated at run time to generate a "stage," which may be defined as a collection of vertices running the same computation on different partitions of a dataset. In one implementation, the optimizer annotates the EPG 318 with metadata properties. For edges of the EPG 318, these annotations may include the data type and the compression scheme, if any, used after serialization. In one implementation, the data types are .NET data types. For nodes of the EPG 318, the annotations may include details of the partitioning scheme used, and ordering information within each partition. The output of a node, for example, might be a dataset that is hash-partitioned by a particular key, and sorted according to that key within each partition. This information can be used by subsequent OrderBy nodes to choose an appropriate distributed sort algorithm. In one aspect, the properties are seeded from the LINQ expression tree and the input and output tables' metadata, and propagated and updated during EPG rewriting.

Propagating these properties may be more difficult than for a conventional database. The difficulties stem from the much richer data model and expression language used to create the application program 310. Consider one of the simplest operations: input.Select(x=>f(x)). If f is a simple expression, e.g. x.name, then it is straightforward for the distributed execution provider 314 to determine which properties can be propagated. However, for arbitrary f it is very difficult to determine whether this transformation preserves the partitioning properties of the input.

The distributed execution provider 314 can usually infer properties in the application programs 310 typical users write. Partition and sort key properties are stored as expressions, and it is often feasible to compare these for equality using a combination of static typing, static analysis, and reflection. In one embodiment, a simple mechanism is provided that allows users to assert properties of an expression 312 when it is difficult or impossible to determine the properties automatically. Further details of static optimizations are discussed below.

In step 406, the vertex code 202 and static data for the vertices are generated. While the EPG 318 encodes all the required information, it is not necessarily a runnable program. In one embodiment, dynamic code generation automatically synthesizes LINQ code to be run at the vertices. The generated code may be compiled into a .NET assembly that is shipped to cluster computers at execution time. The sub-expression in a vertex may be built from pieces of the overall EPG 318. In some implementations, the EPG 318 is created in the original client computer's execution context, and may depend on this context in two ways: (1) The expression 312 may reference variables in the local context. These references are eliminated by partial evaluation of the sub-expression at code-generation time. For primitive values, the references in the expressions 312 may be replaced with the actual values. Object values are serialized to a resource file which is shipped to computers in the cluster at execution time. (2) The expression 312 may reference .NET libraries. In this case, .NET reflection may be used to find the transitive closure of all non-system libraries referenced by the executable, which are shipped to the cluster computers at execution time.

In step 408, serialized objects and serialization code 316 are generated for required data types. As previously mentioned, the user application 310 can be thought of as a hybrid program that has code for executing at the client 302 and code that is executed in parallel in the distributed compute system 304. It may be that the user application 310 refers to a local data object that is needed by the vertex code 202. The serialization code may be bundled with the vertex code 202 and shipped to compute nodes. The serialization code allows the compute nodes to read and write objects having the required data types. The serialized objects are provided to the vertices because the vertex code 202 references those objects. Note that the developer is not required to declare which data is local and which data is remote. The serialization code 316 allows data to be passed in the channels between the vertices. This serialization code 316 can be much more efficient than standard .NET serialization methods since it can rely on the contract between the reader and writer of a channel to access the same statically known datatype.

In step 410, the distributed execution provider 314 generates code for performing dynamic optimizations. Generating code for dynamic optimization is discussed below.

In various embodiments, the distributed execution provider 314 performs both static and dynamic optimizations. The static optimizations may be greedy heuristics or cost-based optimizations. The dynamic optimizations are applied during job execution and may consist in rewriting the job graph depending on run-time data statistics. In various implementations, the optimizations are sound in that a failure to compute properties simply results in an inefficient, though correct, execution plan.

In one embodiment, the static optimizations are conditional graph rewriting rules triggered by a predicate on EPG node properties. Static optimizations may be focused on minimizing disk and network I/O. One optimization includes pipelining, where multiple operators may be executed in a single process. The pipelined processes may themselves be expressions 312 and can be executed by an existing single-computer LINQ implementation. Another optimization removes redundancy. For example, the distributed execution provider 314 can remove unnecessary hash- or range-partitioning steps. Eager aggregation optimizations seek to move down-stream aggregations in front of partitioning operators where possible, since re-partitioning datasets can be resource intensive. The distributed execution provider 314 optimizes for I/O reduction, where possible, by taking advantage of TCP-pipe and in-memory FIFO channels instead of persisting temporary data to files. In one embodiment, data is by default compressed before performing a partitioning in order to reduce network traffic. Users are allowed to manually override compression settings to balance CPU usage with network load if the optimizer makes a poor decision.

In one embodiment, API hooks are used to dynamically mutate the job graph 356 as information from the running job becomes available. For example, the distributed execution provider 314 provides "callback code" to Job Manager 14. This callback code is added to the job graph 206. During runtime, this callback code causes information to be gathered and used to dynamically mutate the job graph 206. The callback code may also perform the dynamic optimizations based on the gathered information.

In one implementation, the mutation is based on aggregation. Aggregation gives a major opportunity for I/O reduction since it can be optimized into a tree according to locality. Data may be aggregated first at the computer level, next at the rack level, and finally at the cluster level. The topology of such an aggregation tree can only be computed at run time, since it is dependent on the dynamic scheduling decisions which allocate vertices to computers. The distributed execution provider 314 may use techniques discussed in U.S. Published Patent Application 2008/0098375, entitled "Runtime Optimization of Distributed Execution Graph."

In one embodiment, dynamic data partitioning is used. Dynamic data partitioning sets the number of vertices in each stage (i.e., the number of partitions of each dataset) at run time based on the size of its input data. Conventional databases usually estimate dataset sizes statically, but these estimates can be very inaccurate. As one example, the estimates may be inaccurate in the presence of correlated queries. In one embodiment, dynamic hash and range partitions are supported. For range partitions both the number of partitions and the partitioning key ranges are determined at run time by sampling the input dataset.

Figure 9:
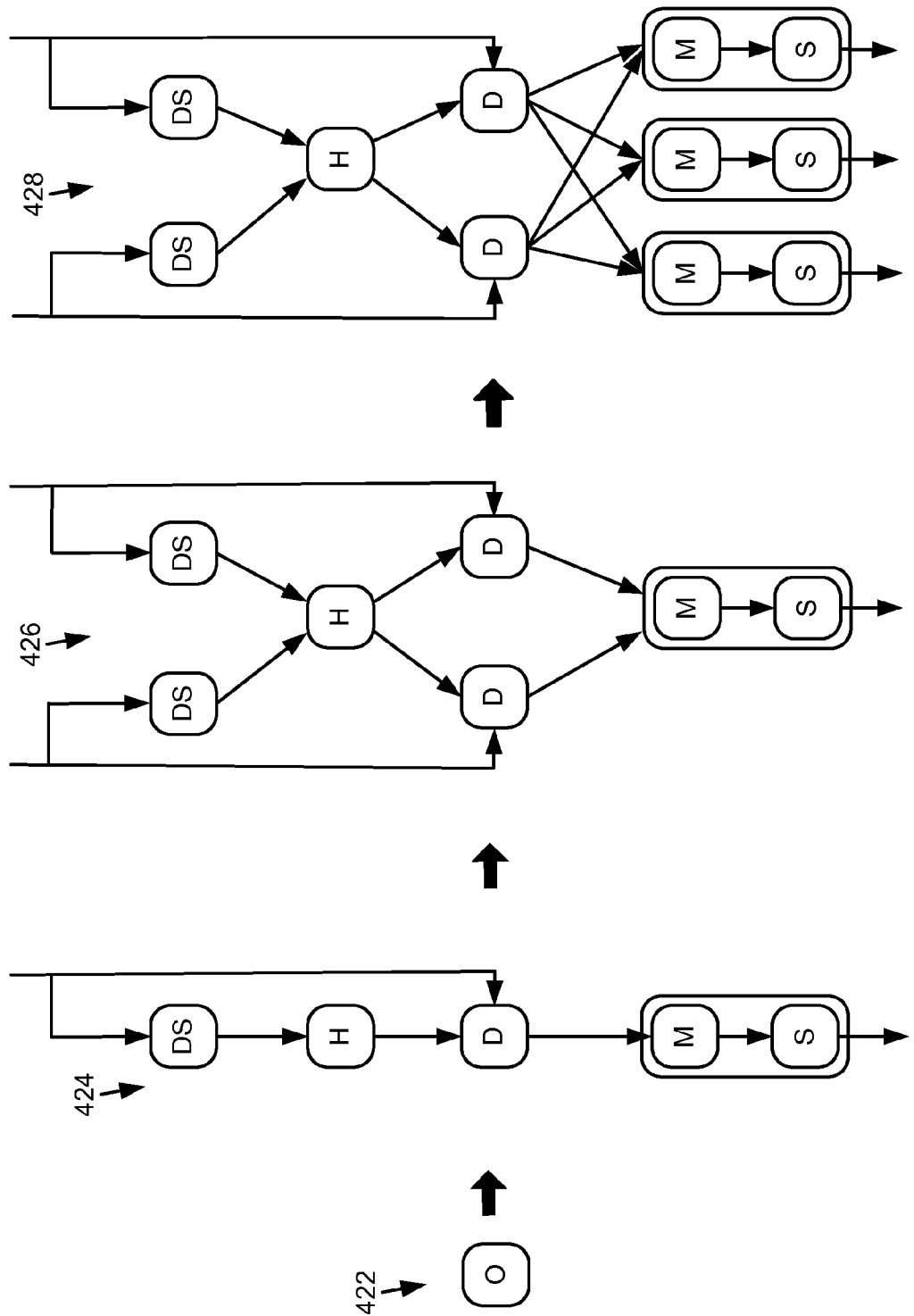
FIG. 9 depicts one embodiment of static and dynamic optimizations of a graph.

The following example for sorting a dataset d illustrates some of the static and dynamic optimizations available. Different strategies are adopted depending on d's initial partitioning and ordering. FIG. 9 shows the evolution of an OrderBy node O 422 in a complex case, where d is not already range-partitioned by the correct sort key, nor are its partitions individually ordered by the key. The transformation of OrderBy node O 422 to graph 424 is static. The transformation of graph 424 to graph 426 and then graph 426 to graph 428 are both dynamic, based on information learned at runtime.

Referring now to graph 424, first the dataset is re-partitioned. The DS stage performs deterministic sampling of the input dataset. The samples are aggregated by a histogram vertex H, which determines the partition keys as a function of data distribution (load-balancing the computation in the next stage). The D vertices perform the actual repartitioning, based on the key ranges computed by H. Next, a merge node M interleaves the inputs, and a S node sorts them. M and S are pipelined in a single process, and communicate using iterators.

The number of partitions in the DS+H+D stages of graph 426 is chosen at run time based on the number of partitions in the preceding computation. The number of partitions in the M+S stages of graph 428 is chosen based on the volume of data to be sorted.

As previously discussed, some embodiments use the LINQ framework. One of the benefits of using the LINQ framework is that other systems that use the same or similar constructs can be leveraged. For example, PLINQ, which allows code to be run within each vertex in parallel on a multi-core server, can be leveraged. PLINQ is described in, "A Query Language for Data Parallel Programming," J. Duffy, Proceedings of the 2007 Workshop on Declarative Aspects of Multicore Programming, 2007, which is hereby incorporated by reference for all purposes. PLINQ attempts to make the process of parallelizing a LINQ program as transparent as possible. PLINQ employs the iterator model since it is better suited to fine-grain concurrency in a shared-memory multi-processor system. Because both PLINQ and certain embodiments of the disclosure use expressions composed from the same LINQ constructs, their functionality may be combined. In some embodiments, vertices execute LINQ expressions, and in general the addition by the code generator of some embodiments of a single line to the vertex's program triggers the use of PLINQ, allowing the vertex to exploit all the cores in a cluster computer.

In some implementations, interoperation with a LINQ-to-SQL system allows vertices to directly access data stored in SQL databases. Running a database on each cluster computer and storing tables partitioned across these databases may be much more efficient than using flat disk files for some applications. Application programs 310 can use "partitioned" SQL tables as input and output in some embodiments. The distributed execution provider 314 of some embodiments identifies and ships some subexpressions to the SQL databases for more efficient execution.

Many data intensive applications involve a series of maps and reductions which provide the building blocks for a wide range of computations. For example, traditional data-mining tasks as well as emerging applications such as web-scale machine learning and graph analysis need to be able to perform these types of operations at scale. The map and reduction programming model represents a special case for a common computational pattern, generally including a prefix for an algorithm and then the algorithm itself. The map phase generates a set of records which are then grouped and reduced for use in subsequent processing. The map reduction programming model expresses a computation using two user-supplied functional programming primitives, namely, a map and a reduce.

The map function operates as shown in definition 1, taking an input record of type T and transforming it to zero or more intermediate tuples of type {K, R}, where K is a key and R is a value record. The reduce function operates as shown in definition 2, taking a set of intermediate value records R, all with the same key K, and outputing zero or more records of type S.

Map: $T \rightarrow$ Sequence of $\{K,R\}$    definition 1

Reduce: $\{K, \text{Group of } R\} \rightarrow$ Sequence of $S$    definition 2

In accordance with one embodiment, user-defined map and reduce functions are used to automatically generate a distributed execution plan, as may be performed at step 356 of FIG. 7 for example. Generally, the execution plan includes a map phase which executes a map function on each input followed by a partitioning of the outputs based on the keys of the intermediate records. The reduce phase of the execution plan collects and merges the records with the same key, and then passes them to a reduce function. The map and reduce functions are user-defined in one embodiment.

The distributed execution provider optimizes the execution plan using auxiliary functions referred to as combiners. The combiner functions allow partial reduction both as part of the initial map phase and through an aggregation tree. When it is possible to combine a set of partial reductions of records with a given key and arrive at the same answer as would be generated by the single reduction, these combiner functions can be applied for significant optimization of the execution plan.

Substantial reductions in network traffic and storage I/O (input/output) can be achieved through partial reduction at the map phase before partitioning the data, and through dynamic aggregation after the map phase but before reduction. One possible function for application of combiner functions is a reduction that implements a commutative and associative aggregation. In these instances for example, the execution provider can perform partial reduction on local machines in the cluster before transmitting data across the network. In one embodiment, the execution provider generalizes the functions to a tree of reductions to make efficient use of a hierarchical network.

By introducing the combiners for partial reduction and aggregation as part of decreasing network traffic, the execution provider conceptually provides four functions. In one embodiment, the four functions are user defined. The first function is again the map function as set forth in definition 1. Definition 3 sets forth the definition for an InitialReduce function which takes a set of value records of type R with the same key K, and outputs a partial reduction encoded as the key K and an intermediate type X The third function is a combine as set forth in definition 4. The combine function takes a set of partial reductions of type X with the same key K, and outputs a new, combined, partial reduction encoded as an object of type X with key K. The fourth function is a FinalReduce as set forth in definition 5. The FinalReduce takes a set of partial reductions X with the same key K, and outputs zero or more records of type S. These functions can be supplied as overrides of a base class in one embodiment, dealing with system-defined "container" objects DataAtom corresponding to an arbitrary record and Tuple corresponding to a sequence of records. The user can use casts and accessor functions to fill in required fields and check that the casts are valid.

InitialReduce: $\{K, \text{Group of } R\} \rightarrow \{K, X\}$    definition 3

Combine: $\{K, \text{Group of } X\} \rightarrow \{K,X\}$    definition 4

FinalReduce: $\{K, \text{Group of } X\} \rightarrow$ Sequence of $S$    definition 5

Figures 10, 11:
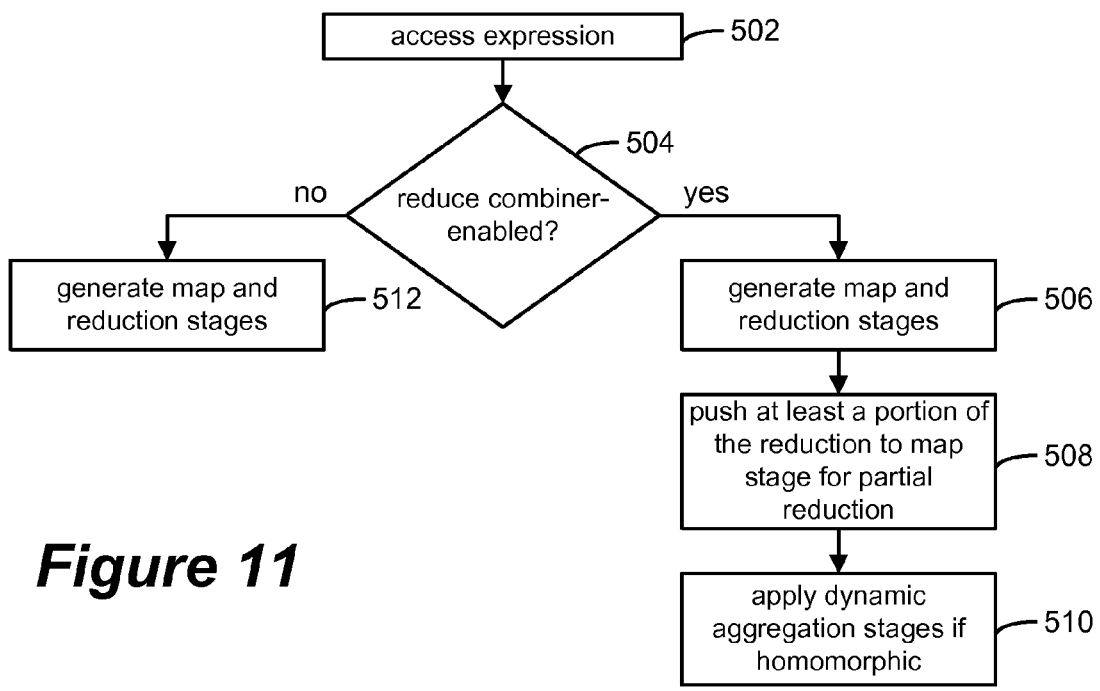
FIG. 10 depicts a signature for a map reduce function and pseudocode for triggering map and reduction processing in accordance with one embodiment.
FIG. 11 is a flowchart for automatically generating an execution plan for an expression including map and reduction processing in one embodiment.

A definition for a map reduction function in accordance with one embodiment is depicted at 450 in FIG. 10. IGrouping{K, R} is a sequential operator type (e.g., LINQ) that corresponds to a key of type K and a set of objects of type R. The MapReduce function is operable on a dataset source using user-definable map, keySelect and reduce functions. In one embodiment, the MapReduce function operates as a helper function. It is noted that invocation of the MapReduce function is not required in one embodiment. The distributed execution provider can identify a pattern of select and group functions in any expression and provide the generation and optimization of an execution plan as hereinafter described. For example, an example of pseudocode that will trigger the map and reduction execution plan generation and optimization is depicted at 452 in FIG. 10. The distributed execution provider can recognize the pattern of SelectMany, GroupBy and SelectMany to trigger map and reduction computations. Including the SelectMany as a primitive in addition to Select enables the straightforward support of a map function that return a sequence of values. It is noted that the use of generics in the example of FIG. 10 allows the user to supply map and reduce functions that operate directly on native language types.

FIG. 11 is a flowchart describing the creation of an execution plan for an expression including map and reduce functionality in accordance with one embodiment. At step 502, an expression from an application executing on a client machine is received or accessed by the distributed execution provider 314. As earlier described, the expression may specifically invoke a MapReduce helper function to trigger processing in the described manner. However, the distributed execution provider can also independently identify expressions as suitable for map reduction processing based on a pattern of Select and GroupBy methods within the expression.

At step 504, the execution provider determines whether the reduce function is reducible or combiner-enabled. Various techniques can be used to determine whether or not the reduce function reducible. The execution provider includes or has access to information indicating reducible functions in one embodiment. For example, the provider may have built-in knowledge that the functions Count, Sum, Max, Min, Average, Variance, All, Any, Contains and Distinct are reducible functions.

In one embodiment, a user can specify that a function is reducible using a reducible annotation (e.g. a C# attribute associated with the designated function) and specify the constituent portions of the reducible function. FIG. 12A depicts pseudocode for a simple example of a function annotated as reducible. The function R is specified as reducible, with the functions F and G identified as constituent portions of the function R. Generally, a function R can be said to be reducible if it can be computed by the composition of some functions F and G satisfying definition 6, for any sequences of s1, ..., sn.

$$R(k, s1\char`^ \ldots \char`^ sn) = G(F(k, s1)\char`^ \ldots \char`^ (F(k, sn)) \quad \text{definition 6}$$

F is a function of type Seq(M)→(k,X), and G is a function of Seq(X)→R. If R can be decomposed in this way, F can be combined with a mapper function M in the map stage. This can reduce the size of an intermediate dataset processed by the GroupBy function. For example, the provider may have built-in knowledge that the functions Count, Sum, Max, Min, Average, Variance, All, Any, Contains and Distinct are homomorphic functions. Other definitions of reducibility can be used. Additionally, a function R can be said to be reducible in one example if all the arguments of R are constants or calls to reducible functions.

In one example, the execution provider determines whether the functions called by the reduce expression are homomorphic or decomposable as part of its determination at step 504. Generally, a given method H is said to be homomorphic if the condition holds that $H(concat(x_1, x_2))=concat(H(x_1), H(x_2))$ for any data partitions $x_1$ and $x_2$. Consider the following function H below, where $\bar{x}$ denotes a sequence of data items, and $\bar{x}_1 \oplus \bar{x}_2$ denotes the concatenation of $\bar{x}_1$ and $\bar{x}_2$. A function H can be said to be homomorphic if there exist two functions F and G satisfying conditions 1, 2, 3 and 4. Condition 1 specifies that H is the composition of F and G. Condition 2 specifies that F is commutative. Condition 3 specifies that G is commutative. Condition 4 specifies that G is associative.

$$\forall \bar{x}_1, \bar{x}_2 : H(\bar{x}_1 \oplus \bar{x}_2) = F(G(\bar{x}_1 \oplus \bar{x}_2)) = G(F(\bar{x}_1) \oplus F(\bar{x}_2)) \quad \text{condition 1}$$

$$\forall \bar{x}_1, \bar{x}_2 : F(\bar{x}_1 \oplus \bar{x}_2) = F(\bar{x}_2 \oplus \bar{x}_1) \quad \text{condition 2}$$

$$\forall \bar{x}_1, \bar{x}_2 : G(\bar{x}_1 \oplus \bar{x}_2) = G(\bar{x}_2 \oplus \bar{x}_1) \quad \text{condition 3}$$

$$\forall \bar{x}_1, \bar{x}_2 : G(G(\bar{x}_1 \oplus \bar{x}_2) \oplus \bar{x}_3) = G(\bar{x}_1 \oplus G(\bar{x}_2 \oplus \bar{x}_3)) \quad \text{condition 4}$$

A function H can be said to be decomposable if there exist two functions F and G satisfying only conditions 1-3. An example of a decomposable function (but not homomorphic) is one where G has differing input and output types. In one embodiment, the distributed execution provider will determine that a reduce function is homomorphic-combiner-enabled if each terminal node of its expression tree satisfies any one of the following conditions, where g is the formal argument of a reduce expression that maps an IGrouping object to a sequence of objects of some other type: 1) it is a constant or of the form g.Key, where Key is the property of the IGrouping interface that returns the group's key; 2) it is of the form H(g) for a homomorphic function H; 3) it is a constructor or method call whose arguments each recursively satisfies one of these conditions. Similarly a reduce function may be determined to be decomposable-combiner-enabled if it can be broken into decomposable functions.

In one embodiment, the execution provider is coded with or has access to information indicating that certain functions are homomorphic and/or decomposable. In one embodiment, an annotation is provided to allow users to designate functions as homomorphic or decomposable functions. The user can specify the constituent parts of expressions that are homomorphic or decomposable so that the execution provider can optimize the execution plan. Consider the example pseudocode depicted in FIG. 12B. FIG. 12B sets for the pseudocode for a function that computes a standard deviation. The pseudocode includes a first function StdIR 520, a second function StdFR 522 and a third function StdDev 524. The annotation Decomposable has been attached to the function StdDev (e.g., as a .NET attribute). The annotation indicates that the function is a decomposable function with respect to the other two functions StdIR and StdFR. Using this annotation, the execution provider determines that the reduce function StdDev is decomposable-combiner-enabled.

Returning to FIG. 11, if the execution provider determines that the reduce is not combiner-enabled, the map and reduction stages for executing the expression in the distributed execution engine are generated at step 512. If the execution provider determines that the reducer is combiner-enabled, it generates map and reduction stages for executing the expression at step 506. Step 506 may include formation of the same map and reduction stages as step 512, followed by optimization to exploit the combiner-enabled feature of the reducer. In another embodiment, the initial map and reduce stage generation for the execution plan graph is different to exploit the combiner-enabled reducer function. At step 508, the execution provider pushes at least a portion of the reduction computation to the map stage to optimize the execution plan graph. The Select function may be partially pushed up through the GroupBy in one embodiment. Continuing with the preceding example, step 508 can include the execution provider automatically using the StdIR function as a combiner for the StdDev function in the map reduction computation. As just mentioned, step 508 may be performed as part of step 506, rather than as an optimization on an already generated plan. If the distributed execution provider determines that the reduce function is homomorphic-combiner-enabled at step 504, dynamic aggregation stages are added to the distributed execution plan at step 510.

Figure 13:
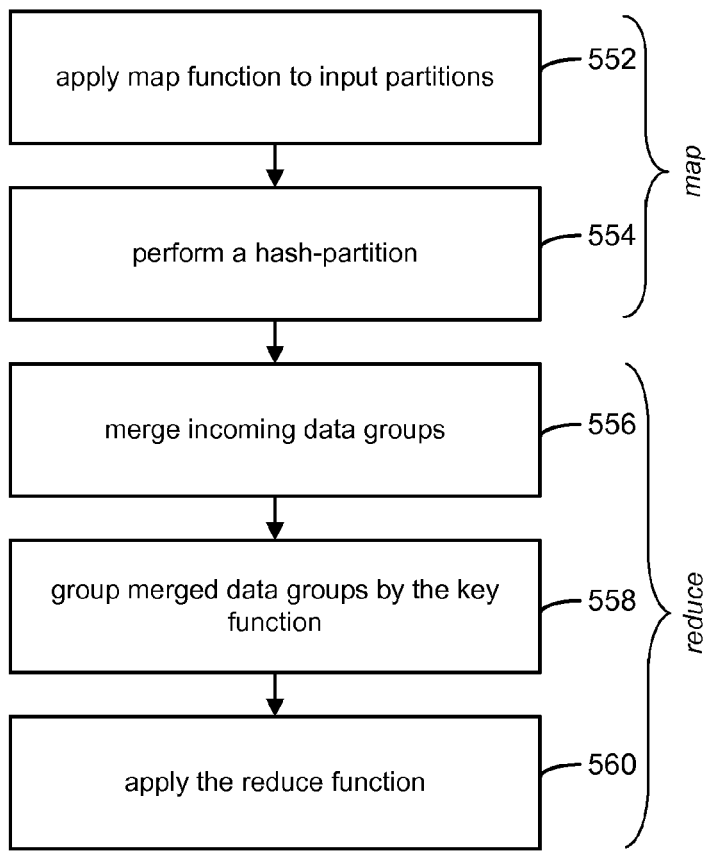
FIG. 13 is a flowchart describing one embodiment of generating an execution plan when a reduce function is not combiner-enabled.

FIG. 13 is a flowchart describing the generation of map and reduce stages for a standard computation in accordance with one embodiment when the reduce function is not combiner-enabled. Steps 552-554 correspond to generation of the map stage and steps 556-560 correspond to generation of the reduce stage.

At step 552, the user-supplied map function is applied to the input partitions. A hash-partition is applied to the input partitions at step 554 based on the user-supplied map function. The map function and hash-partition function are pipelined together in a single process in one embodiment. At step 556, the incoming data groups resulting from the map function are merged together. After being merged, the incoming data is grouped by the key function at step 558. Finally, the reduce function is applied to the grouped data at step 560.

Figure 14:
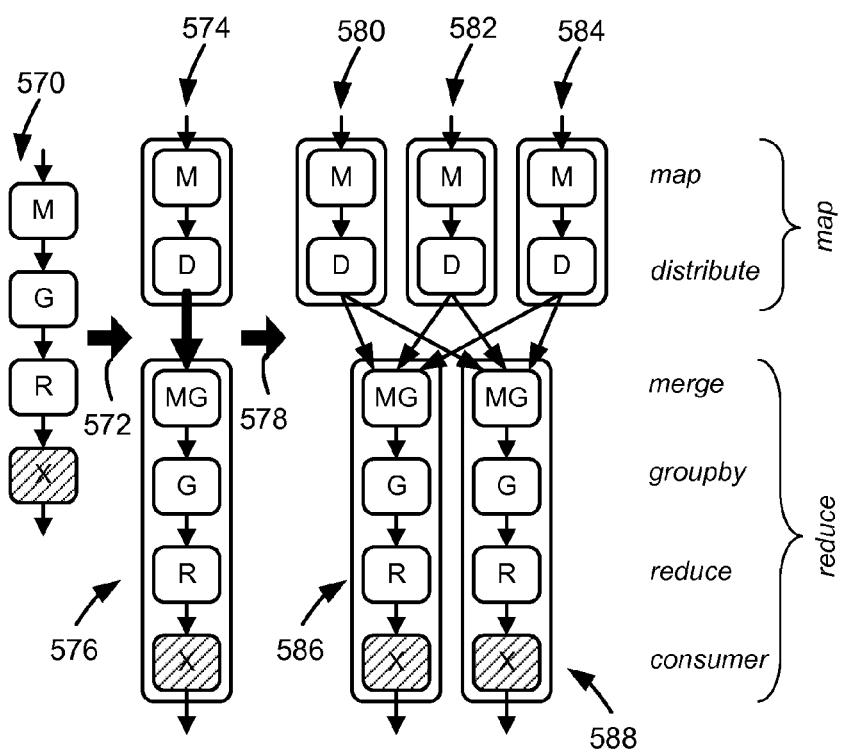
FIG. 14 is an example of a distributed execution plan for map and reduction processing of a non-combiner-enabled reduce function in accordance with one embodiment.

FIG. 14 is an example of an execution plan graph that may be generated in one embodiment for the map and reduce stages of an expression when the reduce function is not combiner-enabled. The initial execution plan 570 for the user supplied expression includes a map operator M, followed by a group operation G on the results of applying the map operator. The grouped data is provided to a reduce operator R, which generates the output data X. Step 572 illustrates a static transformation of the initial plan 570 into a map stage 574 and a reduce stage 576. The map phase executes the map function M on every input, then performs a distribute function D which partitions the outputs based on the keys of the intermediate records resulting from the map operation. The reduce stage 576 collects and merges MG all the records with the same key. After merging the records, a GroupBy operation is performed before passing the results to the reduce function R. The reduce function produces the output files resulting from execution of the user-supplied expression. Step 578 illustrates a dynamic transformation of the map and reduce stages into multiple instances for execution at independent vertices. The map stage is transformed into three map instances 580, 582 and 584. The reduce stage is transformed into two reduce stages 586 and 588. The dynamic transformation is based on the volume of data in the input files as well as the location of the input files. In FIG. 14, three map stage instances and two reduce stage instances are provided as an example only.

Figures 15, 16:
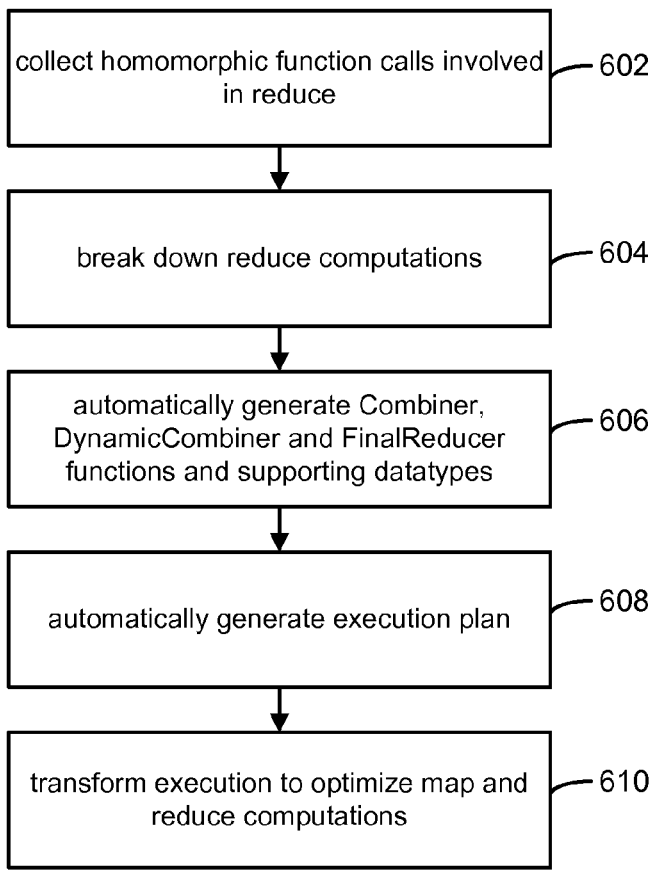
FIG. 15 is a flowchart describing one embodiment of generating an execution plan when a reduce function is combiner-enabled.
FIG. 16 is pseudocode according to one embodiment for automatically generated functions formed as part of the map and reduce phases during generation of an execution plan.

FIG. 15 is a flowchart describing the generation of map and reduce stages for a map reduction computation in accordance with one embodiment when the reduce function is combiner-enabled. The process depicted in FIG. 15 is performed as part of steps 506-510 of FIG. 11 in one embodiment. The technique outlined in FIG. 15 and the details provided hereinafter attempt to push at least a portion of the reduce computation from the reduce stage to the map stage. By doing so, the execution provider seeks to significantly reduce the output of the mappers and thus, the amount of data sent over the network as part of the map stage. As part of the process, the execution provider automatically creates a combiner function and generates the execution plan with this function applied in the map stage.

At step 602, the execution provider collects all the homomorphic functions involved in the reduce computation. In one embodiment, the provider traverses the expression tree of the reduce computation. For the following discussion, the homomorphic functions are denoted $\{H\_1(g), H\_2(g), \ldots, H\_n(g)\}$ and the decomposition functions for the homomorphic functions are denoted $\{C\_1(g), C\_2(g), \ldots, C\_n(g)\}$ and $\{F\_1(g), F\_2(g), \ldots, F\_n(g)\}$.

At step 604, the reduce computation is broken down into constituent portions. At step 606, the execution provider automatically generates code for the constituent portions and as well as the supporting data types for these portions. In one embodiment, the constituent portions of the reduce computation include a Combiner function, a DynamicCombiner function and a FinalReducer function. FIG. 16 depicts example pseudocode for the functions generated at step 606 of FIG. 15 in one embodiment. The Combiner function 620 accepts a Key and a Tuple from the C_1 . . . C_n decomposition function and returns a pair of values. The DynamicCombiner function 622 computes Tuple values h_1 . . . h_n using a Select operator that is applied to the decomposition function F_1 . . . F_n. The FinalReducer function 624 performs a reduction on the h_1 . . . h_n function values resulting from the DynamicCombiner. The functions generated at step 606 and their supporting data types are automatically generated on the fly and shipped to the remote cluster machines at turn time (e.g., after being complied into a DLL).

At step 608, the execution provider automatically generates the execution plan for the user-supplied expression. Step 608 can include generating an initial execution plan graph in one embodiment. In one example, step 608 creates a raw expression tree of the user-supplied expression. After creating the execution plan, the execution provider performs one or more transformations of the plan to form a distributed execution graph including the map and reduce stages at step 610.

Figure 17:
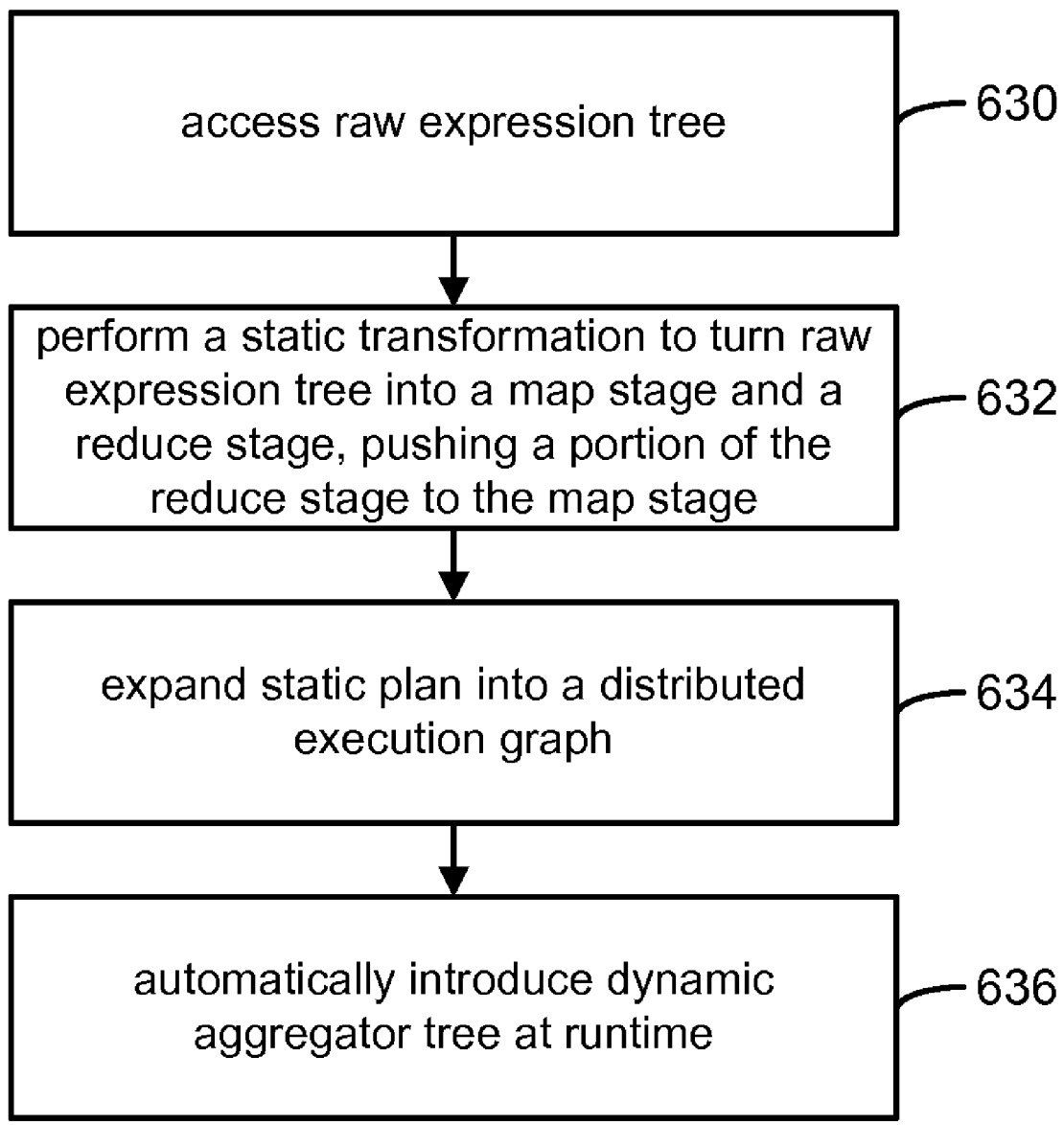
FIG. 17 is a flowchart describing the generation and optimization of a execution plan including a combiner-enabled reduce function according to one embodiment.
Figure 18:
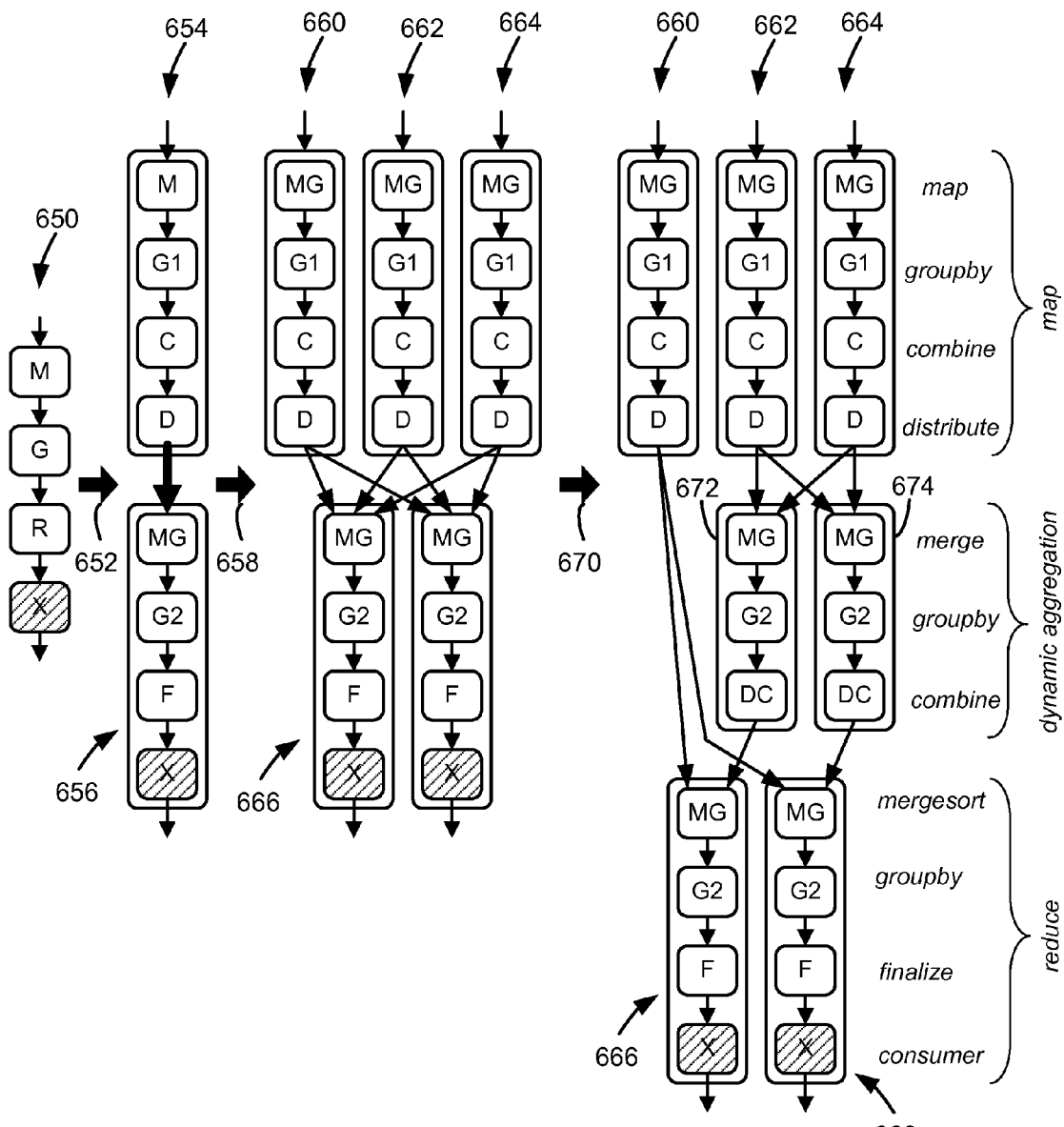
FIG. 18 is an example of a distributed execution plan for map and reduction processing of a combiner-enabled reduce function in accordance with one embodiment.

FIG. 17 is a flowchart describing the transformation of an execution plan as may be performed at step 610 of FIG. 15. FIG. 18 is an example of an execution plan depicting the transformation of a raw expression tree into a final execution plan graph as can be accomplished using the technique in FIG. 17. At step 630, the execution provider accesses the raw expression tree for the user-supplied expression. The original expression tree 650 in FIG. 18 applies a map function M, followed by a group operation G on the input data. After grouping the data, a reduction R is applied to generate final results X.

At step 632, the execution provider performs a static transformation that converts the raw expression tree into a map stage and a reduce stage. In FIG. 18, the first static transformation is represented by arrow 652. The raw expression tree 650 is transformed into map stage 654 and reduce stage 656. The map stage 654 applies the map function M, followed by a local GroupBy G1 and a local reduction C. The local reduction uses the Combiner function 620, as can be generated at step 606 in FIG. 15. The map stage further includes a distribute function D, which performs a hash-partition on the input dataset based on the GroupBy G1 key. The map M, GroupBy G1, reduction C, and distribute D operations are pipelined together in a single process in one embodiment. The reduce stage performs a merge MG of all the incoming data. After merging the data, the Reduce stage performs another GroupBy G2, followed by another reduction F. The reduction F in the Reduce stage is the FinalReducer function 624 generated at step 606 of FIG. 15 in one embodiment. As with the Map stage, the merge MG, GroupBy G2 and reduction F in the Reduce stage are pipelined together in a single process in one embodiment.

At step 634, the static execution plan including map and reduce stages is "expanded" into a distributed execution graph. Step 634 is dynamic. In one embodiment, the number of map vertices is determined by the number of input partitions. Similarly, the number of reduce vertices is determined by the total size of the output of the map stage in one embodiment. As illustrated in FIG. 18 by arrow 658, the map stage is dynamically expanded into three map stage vertices 660, 662, and 664. The reduce stage is dynamically expanded into two reduce stage vertices 666 and 668. The number of vertices in FIG. 17 is merely one example. Each of the partitioned outputs from the map stage vertices are provided to each of the reduce stage vertices.

At step 636, a dynamic aggregator tree is automatically introduced into the execution plan at runtime. The dynamic aggregator tree uses the DynamicCombiner function 622 generated at step 606 of FIG. 15 in one embodiment. The dynamic aggregator tree further reduces the amount of data sent of the network. In one embodiment, the dynamic aggregation is principally used to aggregate data partitions that are on the same machine or rack. The aggregation policy and vertex code is supplied by the execution provider in one embodiment. The introduction of the dynamic aggregator tree is represented by arrow 670 in FIG. 17. Two aggregation vertices 672 and 674 are created in this example. Each vertex includes a merge operation MG, followed by a GroupBy operation G2, then a combine operation DC. The combine operation DC is the DynamicCombiner function generated at step 606 of FIG. 15.

As FIG. 18 illustrates, the introduction of the dynamic aggregation vertices 672 and 674 does not affect the map and reduce stages. The map vertices 660-664 remain unchanged, as do the reduce vertices 666 and 668. The dynamic aggregator vertices accept as inputs the data resulting from the distribute functions at map vertices 662 and 664. This aggregation can represent local aggregation of data partitions that are on the same machine or rack, for example.

A number of optimizations are available to the distributed execution provider 314 for the map and reduction computations. Consider the combiner function introduced into the map stage, as shown by the GroupBy and Combiner functions G1+C in FIG. 18. The actual implementation of this combination can impact the usefulness of this optimization and also the optimizations of the upstream and downstream computations. With the goal of optimizing the entire program, not just the map and reduction subcomponents, a number of implementation choices are available.

In one example, the GroupBy G1 in the map stage is implemented using a FullHash. A hashtable is used to build all the groups according to the GroupBy key, and then apply the combiner to each group. This technique may achieve a large local reduction for the map stage. The FullHash may also provide a general implementation as it only requires the type of the key implement equality comparison.

In another example, the GroupBy G1 is implemented using a FullSort. The GroupBy is implemented by sorting all the objects using the GroupBy key. Following the GroupBy, an iteration through the sorted objects is performed to form groups and apply the combiner function. One implementation ensures that the output partitions of the map vertex remain sorted. A mergesort for the Merge operations (MG) can be used to preserve the object ordering in the dynamic and reduce stages, which makes the GroupBy (G2) a simple streaming operation. This means any downstream operator (X in FIG. 18) can be unconditionally pipelined into the reduce stage.

Another example uses a PartialHash implementation to apply the combiner function on partial groups. It is similar to FullHash, except that if there is hashcode collision, the old (partial) group in the hash bucket is evicted and emitted after applying the combiner function. This avoids the need to hold the entire dataset in memory, which is not practical at times. The tradeoff may be a less effective reduction than the FullHash or FullSort. The FullHash can be used in the dynamic aggregation stage to address the less effective reduction.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the disclosed subject matter be defined by the claims appended hereto.

What is claimed is:

1. A machine implemented method for distributed parallel processing, comprising:
   receiving an expression from a sequential program that is executing at a first machine;
   analyzing the expression for one or more patterns indicative of suitable map and reduction processing;
   automatically generating an execution plan including a map phase and a reduction phase for executing the expression in parallel at nodes of a compute cluster in response to a positive identification of the one or more patterns, the reduction phase includes a reduce function and the map phase includes a data partitioning operation;
   providing the execution plan to an execution engine that controls parallel execution of the expression in the computer cluster; and
   optimizing the execution plan prior to providing the execution plan to the execution engine, the optimizing includes determining that the reduce function is combiner-enabled and in response to the determining, moving a grouping function from the reduce phase to before the data partitioning operation of the map phase to effect a partial data reduction prior to the data partitioning operation.

2. A machine implemented method according to claim 1, wherein:
   the expression includes related select and group functions;
   the analyzing the expression for one or more patterns includes analyzing the expression for one or more select and group patterns indicative of suitable map and reduction processing; and
   the generating the execution plan to include the map phase and the reduction phase is in response to a positive identification of the one or more select and group patterns.

3. A machine implemented method according to claim 1, wherein determining that the reduce function is combiner-enabled includes determining that the reduce function is either homomorphic or decomposable.

4. A machine implemented method according to claim 3, wherein optimizing the execution plan includes:
   if the reduce function is determined to be homomorphic, adding a dynamic aggregation phase to the execution plan.

5. A machine implemented method according to claim 3, wherein:
   determining that the reduce function is homomorphic or decomposable includes determining that the reduce function includes a homomorphic annotation or a decomposable annotation.

6. One or more processor readable storage devices having processor readable code stored thereon, the processor readable code programs one or more processors to perform a method comprising:
   accessing an expression from a sequential program that is executing at a first machine, the expression including related select and grouping functions;
   automatically generating an execution plan for parallel processing of the expression by a distributed execution engine, the execution plan including a map phase corresponding to the select function and a reduce phase corresponding to the grouping function, the map phase specifying a data partition operation of an input dataset for distribution to a plurality of nodes in the distributed execution engine, the reduce phase including a combiner-enabled reduce function;
   optimizing the execution plan by decomposing the grouping function and moving at least a portion of the decomposed grouping function from the reduce phase to the map phase, the at least a portion of the decomposed grouping function including a partial data reduction to reduce a size of the input dataset prior to the data partition operation;

automatically adding a dynamic aggregation between the map phase and the reduce phase if the reduce phase is homomorphic; and providing the execution plan to the distributed execution engine for controlling parallel execution of the expression.

7. One or more processor readable storage devices according to claim 6, wherein automatically generating the execution plan includes:

analyzing the expression from the sequential program for one or more patterns indicative of suitable map and reduction processing; and generating the map phase and reduce phase in response to a positive identification of the one or more patterns.

8. One or more processor readable storage devices according to claim 6, further comprising:

determining whether the reduce phase is homomorphic-combiner-enabled by determining whether one or more functions of the reduce phase are homomorphic functions; and wherein the dynamic aggregation aggregates data from the map phase and is only added to the execution plan if the reduce phase is homomorphic-combiner-enabled.

9. One or more processor readable storage devices according to claim 8, wherein:

the dynamic aggregation aggregates partitioned results of the map phase from a single machine.

10. One or more processor readable storage devices according to 6, wherein:

the distributed execution engine includes a compute cluster having a plurality of nodes, the distributed execution engine controlling parallel execution of the expression in the compute cluster;

automatically generating the execution plan includes automatically generating an execution plan graph having vertices, automatically generating code based on the at least one extension and assigning the code to particular vertices in the execution plan graph, the automatically generating the execution plan being performed by a distributed execution provider; and the method further comprises distributing the code to nodes in the compute cluster corresponding to the particular vertices in the execution plan graph.

11. A distributed parallel processing system, comprising:

a compute cluster including a plurality of nodes, each node including at least one processor;

an execution provider that accesses expressions from a sequential program that is running at a first machine, the execution provider determines that at least one expression from the sequential program can be expressed using map and reduction computations based on one or more patterns indicative of suitable map and reduction processing, the execution provider automatically generates an execution plan graph and code for vertices in the execution plan graph for parallel processing of the at least one expression, the execution provider generates at least one map phase including a data partitioning operation and at least one reduce phase including a reduce function for the execution plan graph, the code for vertices in the execution plan graph implement the map and reduction computations, the execution provider optimizes the execution plan graph by determining that the reduce function is combiner-enabled and in response to the determining, moving a grouping function from the at least one reduce phase to before the data partitioning operation of the map phase to effect a partial data reduction prior to the data partitioning operation; and an execution engine that receives the execution plan graph and the code from the execution provider and manages parallel execution of the expression in the compute cluster based on the execution plan graph and the code.

12. A distributed parallel processing system according to claim 11, wherein:

the reduce phase includes a plurality of functions:

the execution provider optimizes the execution plan graph prior to providing the execution plan to the execution engine;

the execution provider determines whether the reduce phase is decomposable based on the plurality of functions; and if the execution provider determines that the reduce phase is decomposable, the execution provider optimizes the execution plan graph by shifting one or more of the reduce phase functions to the map phase.

13. A distributed parallel processing according to claim 12, wherein:

the execution provider determines whether the reduce phase is homomorphic based on the plurality of functions; and if the execution provider determines that the reduce phase is homomorphic, the execution provider optimizes the execution plan graph by inserting a dynamic aggregator between at least a portion of the map phase and at least a portion of the reduce phase.

14. A distributed parallel processing system according to claim 12, wherein:

the execution provider determines whether the reduce phase is decomposable by determining whether the plurality of functions include decomposable annotations.

15. A distributed parallel processing system according to claim 12, wherein:

the execution provider analyzes the at least one expression from the sequential program for the one or more patterns indicative of suitable map and reduction processing;

the execution provider generates the at least one map phase and the at least one reduce for the execution plan graph in response to positively identifying the one or more patterns.

16. A distributed parallel processing system according to claim 11, wherein:

the execution engine distributes the code for vertices in the execution plan graph to nodes in the compute cluster corresponding to the vertices in the execution plan graph.

* * * * *